(12) United States Patent
Sato et al.

(10) Patent No.: US 8,462,232 B2
(45) Date of Patent: Jun. 11, 2013

(54) INFORMATION PROCESSING APPARATUS, INFORMATION PROCESSING METHOD, PROGRAM, SYSTEM, AND IMAGING OBJECT GENERATION DEVICE

(75) Inventors: Masahiko Sato, Tokyo (JP); Sho Murakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 12/691,011

(22) Filed: Jan. 21, 2010

(65) Prior Publication Data
US 2010/0188514 A1 Jul. 29, 2010

(30) Foreign Application Priority Data
Jan. 28, 2009 (JP) ................. P2009-017189

(51) Int. Cl.
*H04N 5/225* (2006.01)
*H04N 5/76* (2006.01)

(52) U.S. Cl.
USPC ..................................... 348/231.6

(58) Field of Classification Search
USPC ............. 348/207.1, 231.99, 231.2, 231.6
See application file for complete search history.

(56) References Cited

U.S. PATENT DOCUMENTS
5,900,909 A * 5/1999 Parulski et al. ............ 348/231.6

FOREIGN PATENT DOCUMENTS
| JP | 2000-331006 | 11/2000 |
| JP | 2005-345632 | 12/2005 |
| JP | 2008-178499 | 8/2008 |
| JP | 2008-225920 | 9/2008 |

* cited by examiner

*Primary Examiner* — Timothy J Henn
(74) *Attorney, Agent, or Firm* — Sherr & Jiang, PLLC

(57) ABSTRACT

An information processing apparatus is provided which includes an imaging data acquisition unit for obtaining imaging data obtained by imaging an imaging object which is asymmetric in at least one of vertical direction and horizontal direction, an orientation detection unit for detecting the orientation of the imaging object with respect to the top, bottom, left, and right of the imaging data obtained by the imaging data acquisition unit, and a related information selection unit for selecting one or more related information, from among a plurality of related information prepared in advance, according to the orientation of the imaging object detected by the orientation detection unit.

11 Claims, 20 Drawing Sheets

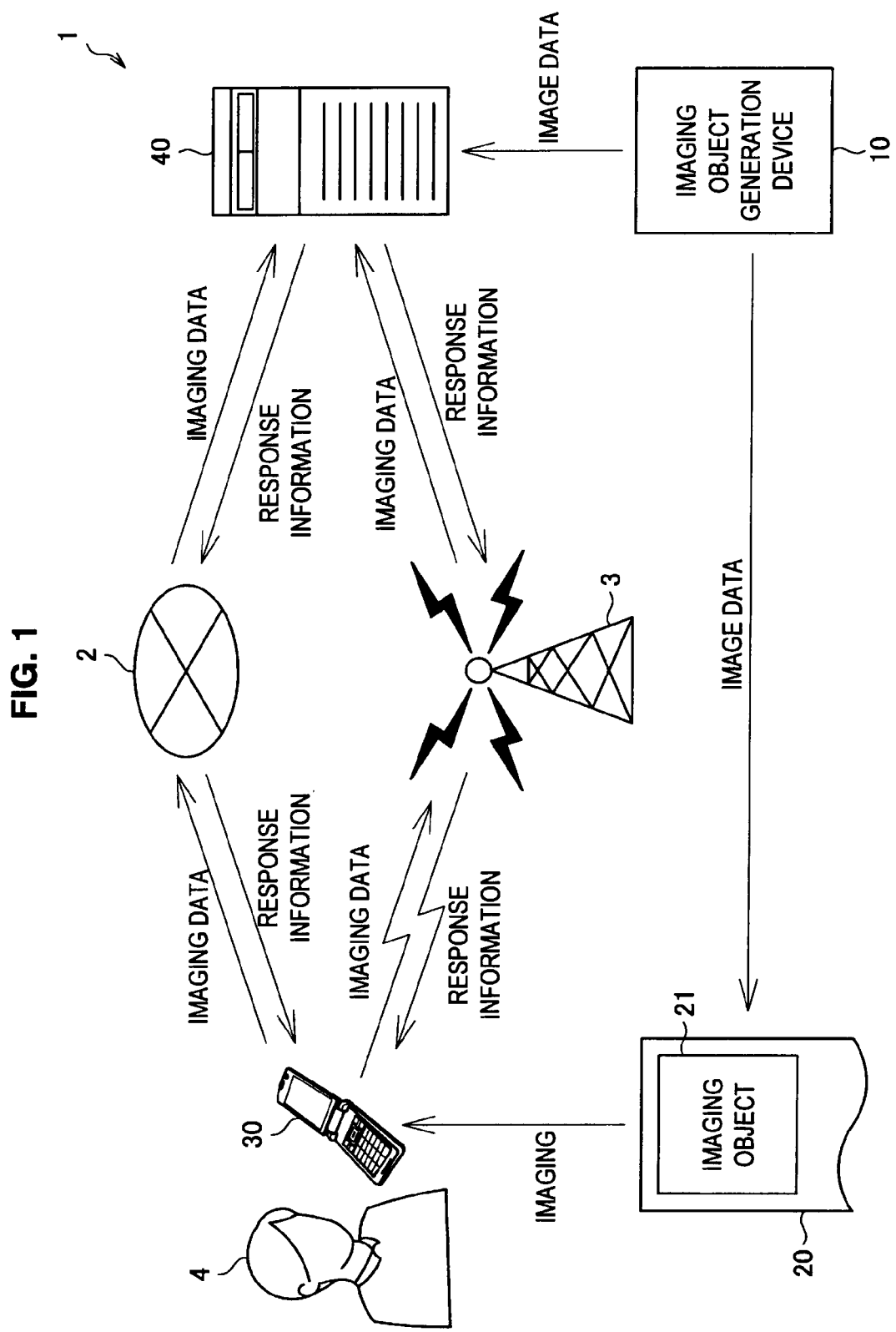

FIG. 4B

COUPON SITE PUB "THE ○×△ PUB"

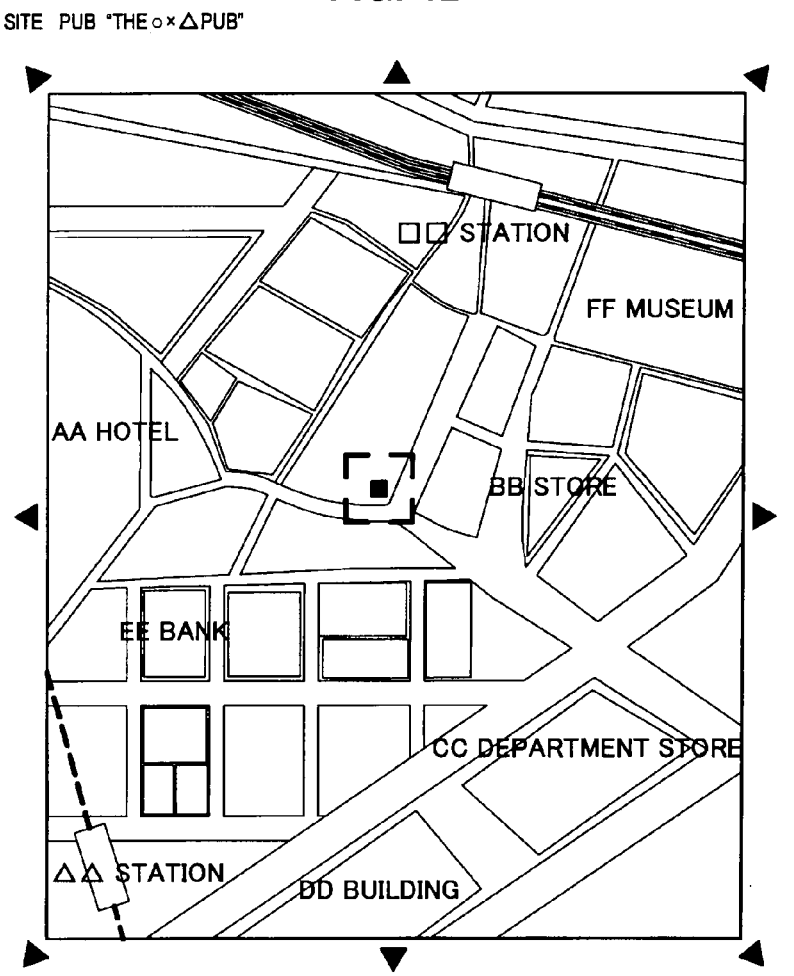

MAP SCALE : 1/5000 | 1/10000 | 1/25000 | 1/70000 | 1/250000 | 1/250000 | 1/500000 | UNDO

[ SEE MAP PREPARED BY SHOP ]   [ ROUTE TO SHOP ]

| | |
|---|---|
| ADDRESS | ○○ BLDG. 3<sup>RD</sup> 1-23-45 ○○○○ TOKYO, 123-4567 |
| ACCESS | 3 MIN. WALK FROM □□ STATION, □□ LINE<br>5 MIN. WALK FROM △△ STATION, △△ LINE |
| TEL | 03-1234-5678<br>0120-123-456 |
| FAX | 03-1234-5678 |
| OPEN HOURS | MON. TO FRI. 17:00~05:00 (L.O.04:30)<br>SUN. AND NATIONAL HOLIDAY 17:00~24:30 (L.O.24:00) |
| SHOP HOLIDAY | NONE |
| REMARKS | — |

INPUT YOUR EVALUATION BY PHOTOGRAPHING WITH YOUR MOBILE PHONE'S CAMERA

FIG. 4C

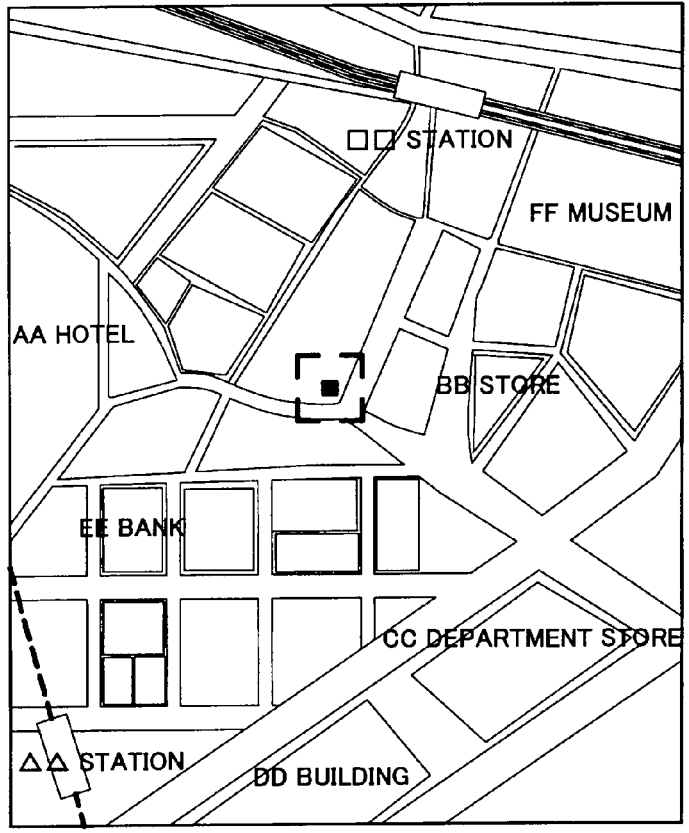

| COUPON SITE | PUB "THE ○×□PUB" |
|---|---|
| | [ONE DRINK FREE] BEER, COCKTAIL, SOFT DRINK |

※TERM EXPIRES 1/31/2009     BRING THIS COUPON PRINTED OUT

YOUR ADDRESS _____
YOUR NAME _____  YOUR BIRTH DATE _____
YOUR EMAIL ADDRESS _____  MALE    FEMALE

| ADDRESS | ○○ BLDG. 3${}^{RD}$ 1-23-45 ○○○○ TOKYO, 123-4567 |
|---|---|
| ACCESS | 3 MIN. WALK FROM □□ STATION, □□ LINE<br>5 MIN. WALK FROM △△STATION, △△LINE |
| TEL | 03-1234-5678<br>0120-123-456 |
| FAX | 03-1234-5678 |
| OPEN HOURS | MON. TO FRI. 17:00~05:00 (L.O.04:30)<br>SUN. AND NATIONAL HOLIDAY 17:00~24:30 (L.O.24:00) |
| STORE HOLIDAY | NONE |
| REMARKS | – |

GOOD
AVERAGE
BAD

INPUT YOUR EVALUATION BY PHOTOGRAPHING WITH YOUR MOBILE PHONE'S CAMERA

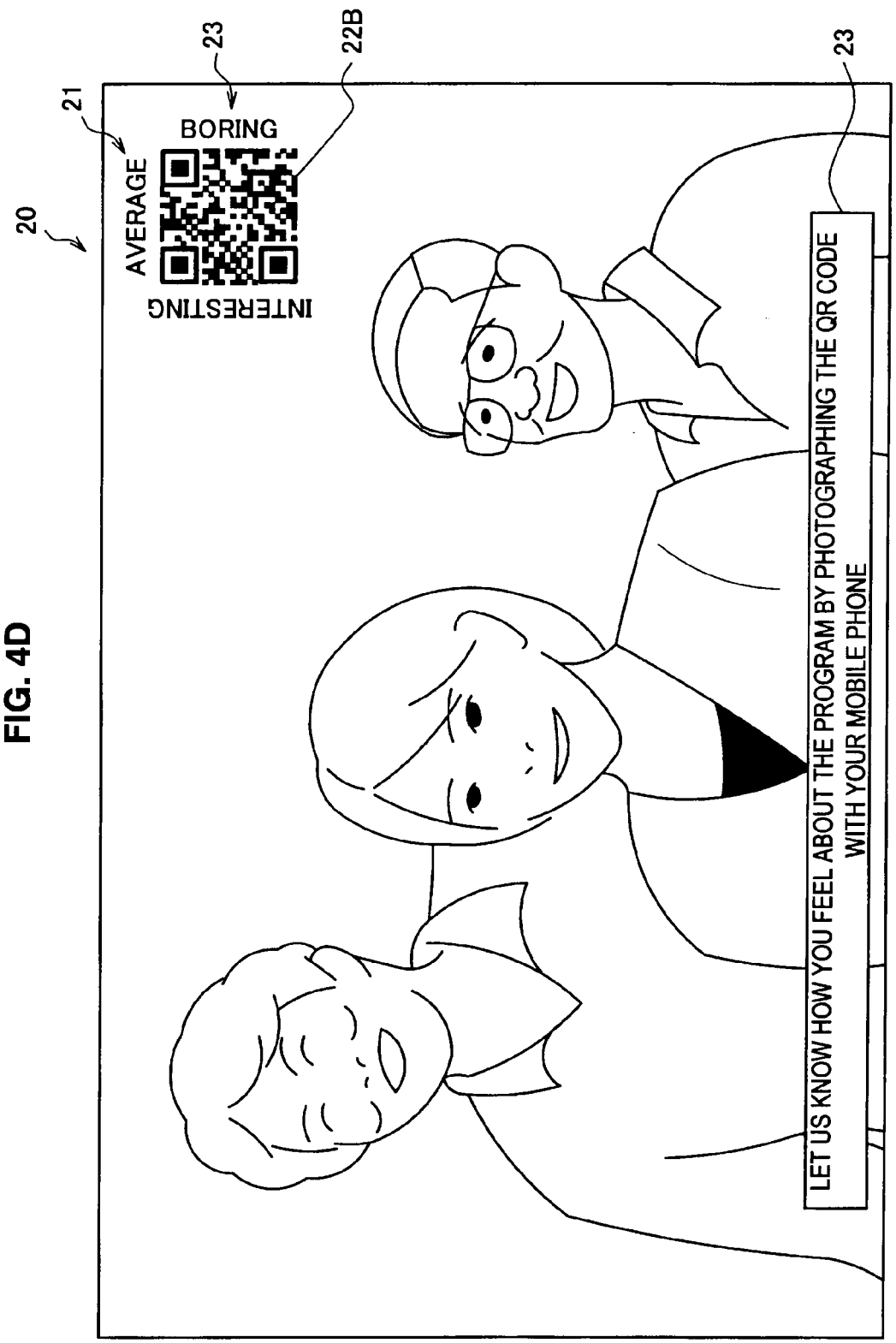

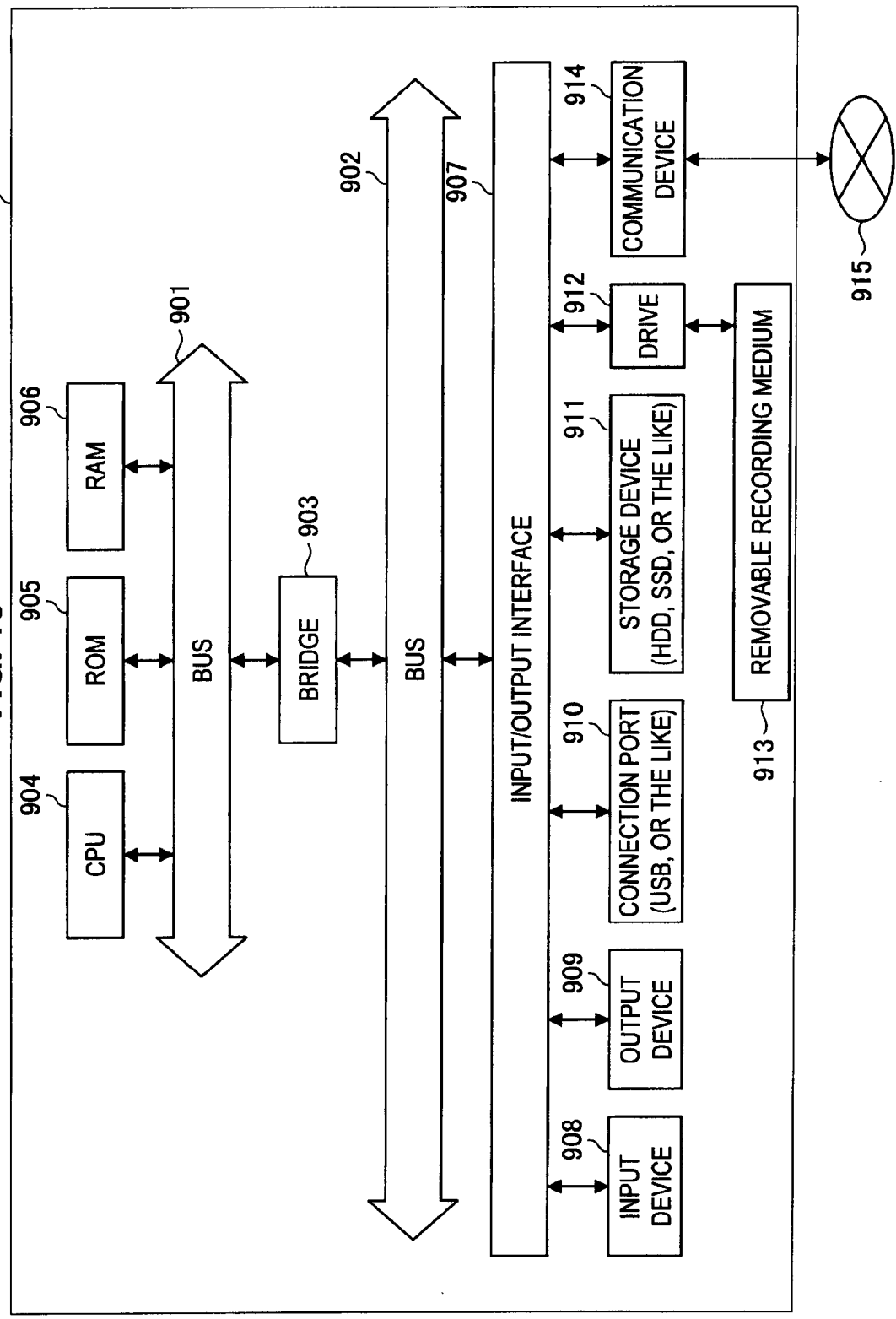

INFORMATION PROCESSING APPARATUS, INFORMATION PROCESSING METHOD, PROGRAM, SYSTEM, AND IMAGING OBJECT GENERATION DEVICE

BACKGROUND OF THE INVENTION

1. Field of the Invention

The present invention relates to an information processing apparatus, an information processing method, a program, a system, and an imaging object generation device.

2. Description of the Related Art

In recent years, there have been developed methods of collecting a variety of consumers' needs by the development of mobile phones and the Internet. Such needs can be utilized for various purposes such as for determining a direction of product development and a marketing strategy.

In this case, information collection by mobile phones or the Internet is often carried out by users inputting on the website opinions on a product or service via keyboards or by mouse operation.

[Patent Document 1] Japanese Unexamined Patent Application Publication No. 2005-345632

SUMMARY OF THE INVENTION

On the other hand, by the spread of mobile phones with imaging devices (also referred to as "cameras" hereinafter), there has been developed a mobile phone capable of transmitting imaging data (image data) obtained by its imaging device and obtaining related information corresponding to the imaging data. An acquisition history of the related information by the mobile phone can be very useful information to know the user's need, similarly to a search history of websites on the Internet.

However, subjects imaged in such manner or websites viewed are often fixed in advance. Accordingly, even though the interest level unrelated to users' evaluation of a product or service can be known from the acquisition history of related information or from the search history of websites, it is difficult to grasp evaluation level reflecting the users' actual preference.

In order that such evaluation data are collected, similarly to the case of opinion collection on the website, users have to input their evaluation by key operation, and thus a large number of users feel such operation a burden. The users who feel such operation a burden are not likely to perform such operation even if they intend to cooperate in collecting evaluation data on a product or service, and sufficient information collection is therefore difficult to be achieved.

Then, the present invention has been made in view of the above issues, and it is desirable to provide a novel and improved information processing apparatus, information processing method, program, system, and imaging object generation device, capable of reducing the burden on informants and collecting information more easily and certainly.

According to an embodiment of the present invention, there is provided an information processing apparatus including an imaging data acquisition unit for obtaining imaging data obtained by imaging an imaging object which is asymmetric in at least one of vertical direction and horizontal direction, an orientation detection unit for detecting the orientation of the imaging object with respect to the top, bottom, left, and right of the imaging data obtained by the imaging data acquisition unit, and a related information selection unit for selecting one or more related information, from among a plurality of related information prepared in advance, according to the orientation of the imaging object detected by the orientation detection unit.

Moreover, the information processing apparatus may include an image data storage unit in which image data including at least a part of the imaging object is recorded in advance, and the orientation detection unit may detect the orientation of the imaging object by comparing the imaging object included in the imaging data obtained by the imaging data acquisition unit and at least a part of the imaging object included in the image data recorded in the image data storage unit.

Moreover, the orientation detection unit may detect, as the orientation of the imaging object, at least an angle of the top, bottom, left, and right of the imaging object with respect to the top, bottom, left, and right of the imaging data obtained by the imaging data acquisition unit, and the related information selection unit may select the related information according to the angle of the imaging object detected by the orientation detection unit.

Moreover, the imaging data acquisition unit may obtain the imaging object imaged by an external terminal including an imaging device and transmitted from the terminal, and the information processing apparatus may further include a selection history storage unit for accumulating a selection history of the related information by the related information selection unit.

Moreover, the imaging data acquisition unit may be an imaging device for imaging the imaging object, and the information processing apparatus may further include a communication unit for transmitting to an external storage device a selection result of the related information by the related information selection unit.

The information processing apparatus may further include a related information transmission unit for transmitting to the terminal the related information selected by the related information selection unit.

Moreover, the image may be a one-dimensional or two-dimensional code in which predetermined code information is recorded, the information processing apparatus may include an information extraction unit for extracting, from the code included in the imaging data obtained by the imaging data acquisition unit, the predetermined code information recorded in the code, and the related information selection unit may select the related information allotted to the orientation of the imaging object, based on the predetermined code information extracted by the information extraction unit and the orientation of the imaging object detected by the orientation detection unit, from among the plurality of related information related with the predetermined code information.

Moreover, the imaging object may include instruction information indicating a relationship between an orientation of the imaging object to be photographed and related information to be selected by the related information selection unit.

Moreover, the plurality of related information prepared in advance may be a plurality of evaluation information each of which indicates a user satisfaction level with a product or a service related with the imaging object, and the related information selection unit may select one of the evaluation information according to the orientation of the imaging object.

According to another embodiment of the present invention, there is provided an information processing method, including the steps of obtaining imaging data obtained by imaging an imaging object which is asymmetric in at least one of vertical direction and horizontal direction, detecting the orientation of the imaging object with respect to the top, bottom, left, and right of the imaging data obtained at the imaging data obtaining step, and selecting one or more related information, from among a plurality of related information prepared in advance, according to the orientation of the imaging object detected at the orientation detecting step.

According to another embodiment of the present invention, there is provided a program for causing a computer to perform the functions of obtaining imaging data obtained by imaging an imaging object which is asymmetric in at least one of vertical direction and horizontal direction, detecting the orientation of the imaging object with respect to the top, bottom, left, and right of the imaging data obtained by the imaging data obtaining function, and selecting one or more related information, from among a plurality of related information prepared in advance, according to the orientation of the imaging object detected by the orientation detecting function.

According to another embodiment of the present invention, there is provided a system including a terminal for imaging an imaging object which is asymmetric in at least one of vertical direction and horizontal direction, and a server for obtaining imaging data obtained by imaging the imaging object from the terminal. At least one of the terminal and the server includes an imaging data acquisition unit for obtaining the imaging data obtained by imaging the imaging object, an orientation detection unit for detecting the orientation of the imaging object with respect to the top, bottom, left, and right of the imaging data obtained by the imaging data acquisition unit, and a related information selection unit for selecting one or more related information, from among a plurality of related information prepared in advance, according to the orientation of the imaging object detected by the orientation detection unit.

According to another embodiment of the present invention, there is provided an imaging object generation device including an image data storage unit in which image data including an imaging object which is asymmetric in at least one of vertical direction and horizontal direction and is prepared in advance, and an instruction information addition unit for adding to the image data instruction information indicating a relationship between the orientation of the imaging object and one or more related information selected, from among a plurality of related information prepared in advance, according to the orientation of the imaging object with respect to the top, bottom, left, and right of the imaging data, by an external information processing apparatus for obtaining imaging data in which the imaging object is imaged.

According to the present invention described above, it is possible to reduce the burden on information providing users and collect information more easily and certainly.

BRIEF DESCRIPTION OF THE DRAWINGS

FIG. 1 is an explanatory diagram for explaining an overview of a system according to a first embodiment of the present invention;

FIG. 4B is an explanatory diagram for explaining a second example of the medium according to the embodiment including an example of the imaging object;

FIG. 4C is an explanatory diagram for explaining a third example of the medium according to the embodiment including an example of the imaging object;

FIG. 4D is an explanatory diagram for explaining a fourth example of the medium according to the embodiment including an example of the imaging object;

FIG. 16 is an explanatory diagram for explaining a configuration example of a computer for implementing a series of processing by the execution of a program.

DETAILED DESCRIPTION OF THE EMBODIMENT

Figure 2A:
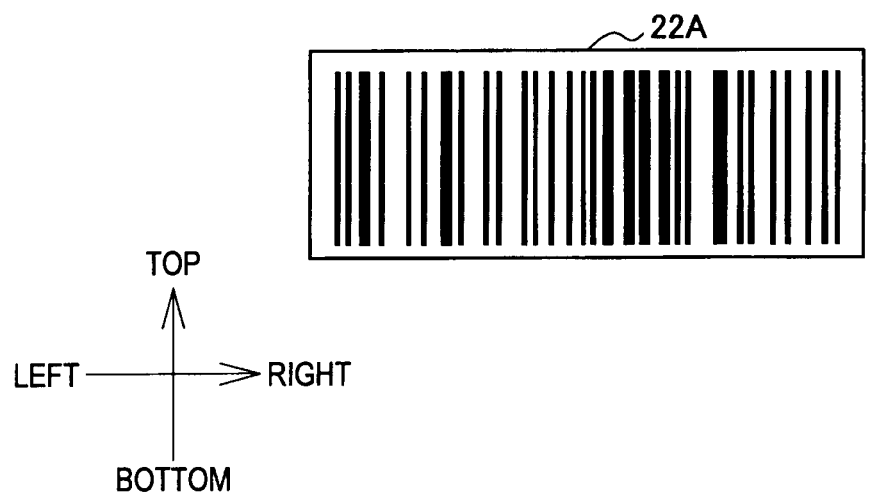
FIG. 2A is an explanatory diagram for explaining a first example of an imaging object according to the embodiment included in image data.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

An information processing apparatus according to each embodiment of the present invention can selectively add predetermined related information according to "an orientation of an imaging object". Such an information processing apparatus can be configured as a part of an information collection system. For example, the information collection system at least includes terminals each of which is possessed by, and to which information is input by, each of a plurality of users, and a server for storing the information. On the other hand, the information processing apparatus for adding predetermined relationship information according to an orientation of an imaging object may be implemented, for example as a terminal or as a server, in the configuration of the information collection system. Accordingly, a case where the information processing apparatus is formed as a server in a first embodiment will be first described in the following, in order that characteristics and the like of the information processing apparatus according to the each embodiment of the present invention can be easily understood. After that, a case where the information processing apparatus is formed as a terminal in a second embodiment will be described on the premise of the information processing apparatus in the first embodiment. At this time, characteristics and the like of the second embodiment different from those of the first embodiment will be described, omitting points similar to those of the first embodiment. In addition, the descriptions will be made here focusing on "an orientation of an imaging object", but it is obvious that the information processing apparatus according to the each embodiment of the present invention also includes other various characteristics described in the each embodiment.

Moreover, the terminals possessed by users are included as an element of the configuration of the information collection system as described above, and a variety of terminals can be used as those terminals. Examples of the terminals may be, for example, notebook or desktop computers, PDAs (Personal Data Assistant), mobile phones (including PHS (Personal Handy-phone System)). However, the terminals are not limited to these examples. A variety of terminals can be used as long as they are possessed by or at least accessed by individual users, and they at least includes a communication function with a server and an imaging function of imaging an imaging object. However, the imaging function may be realized by obtaining imaging data from an imaging apparatus having the imaging function. The descriptions will be made here, taking as an example "mobile phones" which are an example of recently widely used terminals. However, it is obvious that the terminals making up the information collection system are not limited to mobile phones.

On the premise of the above-mentioned points, the each embodiment of the present invention will be described below in the following order.

<1. First embodiment> . . . Implementation as a server
  (1-1. System overview)
  (1-2. Regarding an imaging object and others)
  (1-3. Imaging object generation device)
  (1-4. Operation of the imaging object generation device)
  (1-5. Mobile phone)
  (1-6. Server)
  (1-7. System operation)
  (1-8. Example of advantages of the first embodiment)

<2. Second embodiment> . . . Implementation as a mobile phone
  (2-1. System overview)
  (2-2. Mobile phone)
  (2-3. Server)
  (2-4. System operation)
  (2-5. Example of advantages of the second embodiment)

1. First Embodiment

Implementation as a Server

First, an overview of a system according to a first embodiment of the present invention will be described with reference to FIG. 1. FIG. 1 is an explanatory diagram for explaining the overview of the system according to the first embodiment of the present invention.

As shown in FIG. 1, a system 1 according to the first embodiment of the present invention mainly includes an imaging object generation device 10, a mobile phone 30, and a server 40.

The imaging object generation device 10 includes an imaging object and generates image data 21 to be displayed (display in the form capable of being imaged optically such as print) on a medium 20 (also referred to as "media"). The mobile phone 30 is operated by a user 4 and images an imaging object displayed on the medium 20. FIG. 1 illustrates only one mobile phone 30, but the number of the mobile phone 30 is not particularly limited, and is preferably plural (enough number to obtain statistical data). When imaging the imaging object, the user determines an angle to image the imaging object (also referred to as "orientation of the imaging object"), and the mobile phone 30 images the imaging object with the angle. Accordingly, the orientation of the imaging object is included in imaged image data (also referred to as "imaging data") obtained by imaging by the mobile phone 30. The orientation of the imaging object will be described later in detail. On the other hand, the mobile phone 30 is communicable with a server 40 via a network 2 such as the Internet or a local area network (LAN) or a radio relay antenna 3 for relaying electromagnetic waves. Accordingly, the mobile phone 30 transmits the imaging data to the server 40 via the network 2 or the radio relay antenna 3. The server 40 can extract the orientation of the imaging object from the imaging data and select related information corresponding to its extraction result from among a plurality of related information prepared in advance. At this time, the server 40 can accumulate a selection history of the related information corresponding to the orientation of the imaging object. Examples of the related information include a variety of information which a service or product provider or a research operator desires to collect, such as users' evaluation (satisfaction level such as good, average, bad) of the service or the product. Accordingly, the user 4 can add such related information only by selecting the angle to image the imaging object, namely, the orientation of the imaging object in the imaging data (imaged image), and the system 1 can collect and accumulate the related information to the server 40.

On the other hand, the server 40 replies, in some cases, the related information corresponding to the orientation of the imaging object or the like to the mobile phone 30. In order to distinguish the related information replied to the mobile phone 30 from the related information not replied to the mobile phone 30, the former is referred to as "reply information". However, the related information and the reply information are not necessarily distinguished. Since the reply information is also an example of the related information, it can be selected according to the imaging object as described above. That is, the user 4 can selectively obtain desired reply information only by selecting the angle to image the imaging object.

The outline of the system 1 according to the first embodiment of the present invention has been described above. In the following, each configuration of the system 1 will be specifically described, and the above-mentioned imaging object and the medium 20 on which the imaging object is displayed will be described with reference to FIG. 2A to FIG. 4D in order that the each configuration can be easily understood.

(1-2. Regarding an Imaging Object and Others)

Figure 2B:
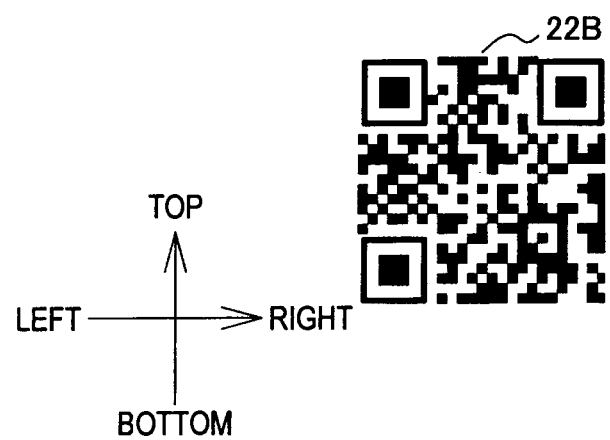
FIG. 2B is an explanatory diagram for explaining a second example of the imaging object according to the embodiment included in the image data.

FIG. 2A and FIG. 2B according to the present embodiment are explanatory diagrams for explaining a first example and a second example of the imaging object included in the image data. FIG. 3A to FIG. 3F according to the present embodiment are explanatory diagrams for explaining a first example to a sixth example of the image data including the imaging object and to which instruction information is added.

(Imaging Object)

A variety of objects expected to be imaged by the user 4 using the mobile phone 30 can be used as the imaging object. In this case, the imaging object is asymmetric in at least one of vertical direction and horizontal direction. If the imaging object is asymmetric in at least one of vertical direction and horizontal direction as such, it is as good as saying that the imaging object has directionality. That is, the imaging object is not symmetric in vertical direction and horizontal direction such as circle, ellipse, or sphere, and may be an object from which at least one of a top-bottom arrangement or a left-right arrangement can be specified.

Such an imaging object is not even necessarily planar, but the description will be made here taking "one-dimensional or two-dimensional code" often imaged by the mobile phone 30 as a first example of the imaging object, for the sake of convenience of description.

FIG. 2A shows a one-dimensional code 22A such as bar code is shown as a first example of the imaging object. On the other hand, FIG. 2B shows a two-dimensional code 22B such as QR code (Quick Response Code, registered trademark) as a second example of the imaging object. Although widely-used bar codes and QR codes are illustrated here, it is not limited to these codes even when the imaging object is a one-dimensional or two-dimensional code. For example, another two-dimensional code such as PDF 417, Data Matrix, and Maxi Code can also be used as long as it is the two-dimensional code 22B, and the one-dimensional code 22A may also be another code in the similar manner. Such an one-dimensional code 22A or a two-dimensional code 22B is suitable to be used as the imaging object since it is asymmetric in at least one of vertical direction and horizontal direction, and is expected to be imaged by the user 4 using the mobile phone 30. However, the imaging object is not limited to these examples as described above.

(Instruction Information)

On the other hand, data including such an imaging object is also referred to as "image data 21" here. The image data 21 is to be displayed on a medium 20 as shown in FIG. 1. However, in the system 1 according to the present embodiment, angles of the imaging object being imaged are correlated with a plurality of related information prepared in advance. Accordingly, in order for such a relationship to be recognized by the user, "instruction information" indicating a relationship between an orientation of the imaging object and a piece of related information can be also included in the image data 21 displayed on the medium 20. The instruction information will be described with reference to FIG. 3A to FIG. 3F.

Figure 3A:
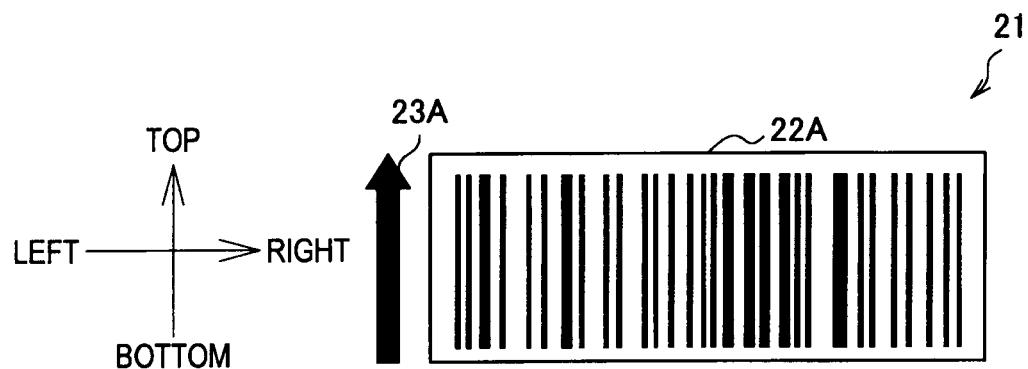
FIG. 3A is an explanatory diagram for explaining a first example of the image data according to the embodiment including the imaging object and to which instruction information is added.

FIG. 3A shows a first example of the image data 21. The image data 21 includes a one-dimensional code 22A as the imaging data, and "an upward arrow (↑)" is further added as instruction information 23A. The user 4 who referred to such image data can recognize which is the upper part.

Figure 3B:
FIG. 3B is an explanatory diagram for explaining a second example of the image data according to the embodiment including the imaging object and to which the instruction information is added.

FIG. 3B shows a second example of the image data 21. In the first example of the image data 21 shown in FIG. 3A, the instruction information 23A is added outside the area of the one-dimensional code 22A, but in the second example of the image data 21 shown in this FIG. 3B, the instruction information 23A constitutes a part of the one-dimensional code 22A. That is, position of additional instruction information is not particularly limited.

Figure 3C:
FIG. 3C is an explanatory diagram for explaining a third example of the image data according to the embodiment including the imaging object and to which the instruction information is added.

FIG. 3C shows a third example of the image data 21. In the third example of the image data 21, instruction information 23B is added above and below the one-dimensional code 22A, as shown in FIG. 3C. The instruction information 23B added above indicates relationship with related information showing an example of evaluation (satisfaction level) by the user 4, "GOOD". On the other hand, the instruction information 23B added below indicates relationship with related information showing an example of evaluation (satisfaction level) by the user 4, "BAD". Here, one of the instruction information 23B added above and the instruction information 23B added below is arranged upside down. Such an upside arrangement shows that by imaging a piece of the instruction information 23B with an angle according to its arrangement, corresponding related information is selected.

Figure 3D:
FIG. 3D is an explanatory diagram for explaining a fourth example of the image data according to the embodiment including the imaging object and to which the instruction information is added.

FIG. 3D shows a fourth example of the image data 21. In the fourth example of the image data 21, instruction information 23C is further added to the left of the one-dimension code 22A in addition to the instruction information 23B, as shown in FIG. 3D. The instruction information 23C indicates a relationship with related information showing an example of evaluation (satisfaction level) by the user 4, "AVERAGE". The instruction information 23C is also arranged being rotated counterclockwise by 90 degrees, and such rotated arrangement by 90 degrees shows that by imaging a piece of the instruction information 23B with an angle according to its arrangement, corresponding related information is selected.

Figure 3E:
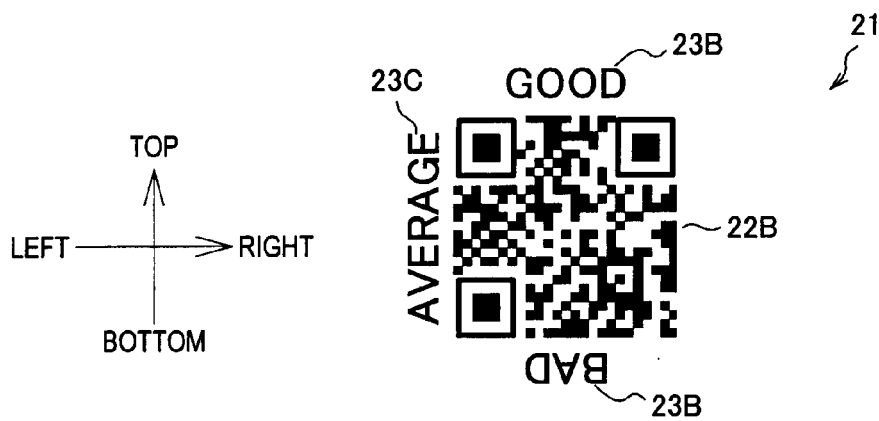
FIG. 3E is an explanatory diagram for explaining a fifth example of the image data according to the embodiment including the imaging object and to which the instruction information is added.

FIG. 3E shows a fifth example of the image data 21. The instruction information 23B, 23C and the like described above can be added to a two-dimensional code 22B which is a second example of the imaging object, as shown in FIG. 3E. In addition, the instruction information 23A represented by arrow can also be added to the two-dimensional code 22B, of course.

Figure 3F:
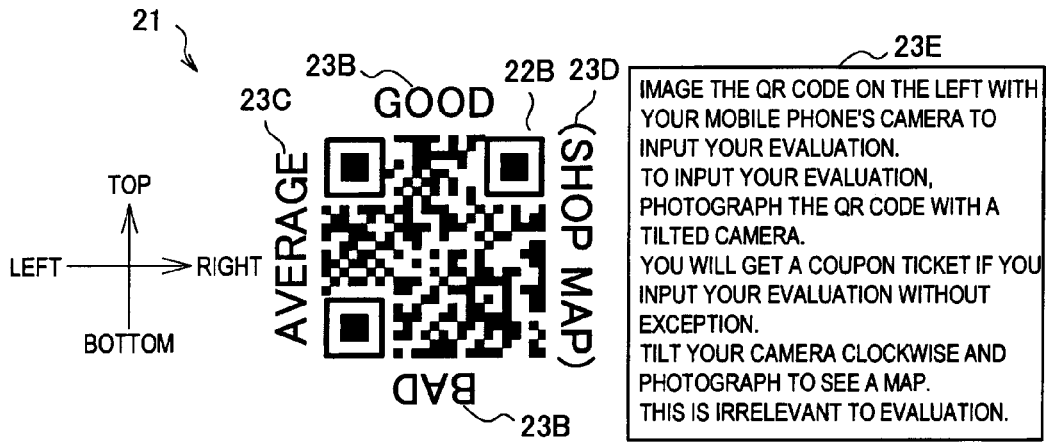
FIG. 3F is an explanatory diagram for explaining a sixth example of the image data according to the embodiment including the imaging object and to which the instruction information is added.

FIG. 3F shows a sixth example of the image data 21. In the sixth example of the image data 21, instruction information 23D and 23E is added in addition to the instruction information 23B and 23C, as shown in FIG. 3F. The instruction information 23D is added to the right of the one-dimension code 22A opposite from the instruction information 23C, and also indicates a relationship between an orientation of the imaging object and related information selected by the orientation, again by using various arrangements. The instruction information 23D indicates relationship with an example of related information (in this case, also referred to as response information) desired to be obtained by the user 4, "SHOP MAP" (map information of the store). On the other hand, like the instruction information 23E, explanatory text on related information to be selected by orientation of the imaging object can be also added to the image data 21. In the case where such explanatory text is added, the instruction information is not necessarily arranged near the imaging object since relationship described above can be explained by the text. In addition, in the sixth example of the image data 21, in the case where the imaging object is imaged so that related information which is an example of the evaluation by the user 4 is selected according to the instruction information 23B or 23C, a "coupon ticket" can be also selected as related information (response information) desired to be obtained by the user 4, similarly to the instruction information 23B or 23C, as described later.

In this manner, at least one or more related information is allotted to an "orientation of the imaging object" in the imaged image which is an angle with which the imaging object included in the image data 21 is imaged. Then, relationship between such an orientation of the imaging object and related information selected by the orientation is shown in instruction information, and the instruction information is included in the image data 21. Moreover, as described in the first example to the sixth example of the image data 21, a variety of information capable of causing the user 4 to recognize relationship as described above can be used for the instruction information. In addition, in the case where the user 4 already recognizes such relationship, the instruction information can be omitted. On the other hand, the imaging object is asymmetric in vertical direction and/or in horizontal direction as described above, there can be also used the imaging object which becomes asymmetric in vertical direction and/or in horizontal direction as a result that asymmetrically represented instruction information is added thereto. In this case, the instruction information is included in the imaging object. Such instruction information will be collectively referred to as "instruction information 23" as well in the following.

(Related Information)

In addition, examples of the one or more related information allotted to an orientation of the imaging object include, for example, as described above, evaluation (e.g., "good, average, bad" or five-grade evaluation) of a predetermined product, service or the like by the user 4, answer to a quiz (e.g., options such as A, B, and C) by the user 4, and predetermined information desired to be obtained by the user 4. Examples of the predetermined information desired to be obtained by the user 4 include information about homepage of the predetermined product or service, map information, evaluation information, and others. The predetermined information desired to be obtained by the user 4 may be used as statistical data similar to the evaluation by the user 4 for marketing strategy, development strategy or the like. However, desired information differs from evaluation information in the sense that not many of the users 4 desire to obtain evaluation made by themselves. Accordingly, supposing that the users 4 do not desire evaluation information made by themselves, the evaluation information is simply referred to as "related information" and information desired to be obtained by the users 4 is referred to as "response information" here, for the sake of convenience of description. However, the response information, as well as the related information in a limited sense described above, is an example of the related information (related information in a broad sense) allotted to an orientation of the imaging object and selected according to an orientation of the imaging object. In addition, it is preferable to use as the imaging object an object corresponding to the predetermined product, service or the like included in the related information illustrated here (e.g., the one-dimensional code 22A or two-dimensional code 22B).

(Medium)

In this way, there is displayed on the medium 20 the image data 21 including the imaging object to whose orientation is allotted the related information and the instruction information indicating the relationship, as described above. A variety of mediums can be used as the medium 20 as long as they are mediums capable of being imaged optically. Examples of the medium 20 include electronic information such as homepage, e-mail, RSS (Resource Description Framework Site Summary) open to the public on the Internet and the like, a printed matter such as paper, book, magazine, advertisement, newspaper on which the electronic information is printed, a store display, a wrapping paper of a product, a something used when providing a service, and others. Other than these, view image (referred to as "television image" hereinafter, including recorded image such as video and DVD) viewed via wired or radio broadcast wave can be also used as the medium 20, for example.

In addition, the image data 21 including the imaging object described above is generated by the imaging object generation device 10. On the other hand, although not shown in FIG. 1, the system 1 according to the present embodiment may have a separate configuration in which the image data 21 is presented in the form capable of being imaged (e.g., display or print). It is also possible that the imaging object generation device 10 itself presents the image data 21. Examples of such a configuration include a variety of devices such as a display device including computer, printer, printing device, and television, a mobile phone, and a PDA.

Figure 4A:
FIG. 4A is an explanatory diagram for explaining a first example of a medium according to the embodiment including an example of the imaging object.

FIG. 4A shows a first example of the medium 20. The first example of the medium 20 shown in FIG. 4A shows a printed matter on which a homepage open to the public on the Internet is printed. The image data 21 is printed on the medium 20 which is the printed matter. In this case, the image data 21 includes, in addition to the two-dimensional code 22B which is the imaging object, an image such as text, drawing, and/or picture representing other information. Furthermore, the instruction information 23 is added to the image data 21.

FIG. 4B and FIG. 4C show a second example and a third example of the medium 20, respectively. The second example and the third example of the medium 20 shown in FIG. 4B and FIG. 4C also show printed matters on each of which a homepage open to the public on the Internet is printed. In recent years, along with the popularization of the Internet, there have been increased opportunities, for the user 4 who plans to receive a service or a product, to check a providing place of the service or the product on the Internet, print a map, and visit the providing place by referring to the printed matter. Furthermore, the user 4 always carries the mobile phone 30 with the imaging function which is also rapidly popularized in recent years. Accordingly, there have also been increased opportunities that the printed matter such as a map includes the two-dimensional code 22B in order that information related to the providing place can be easily obtained by the mobile phone 30 via the Internet. The medium 20 and the imaging object are not limited to such circumstances, but when considering such circumstances, it is appropriate for user's convenience to use the two-dimensional code 22B included in the image data 21 including a map or the like as the imaging object.

FIG. 4D shows a fourth example of the medium 20. The fourth example of the medium 20 shown in FIG. 4D shows a case where a television image is used as the medium 20. In recent years, there have been increased programs causing the user 4 to fill out the questionnaire or to vote in real time by using the mobile phone 30 always carried by the user 4. Accordingly, such a use of the television image by the program as the medium 20 can give a feeling of being involved in a television program not only to an information collector but also to the user 4, so that it is very beneficial. In this case, it is desirable to set the content of the questionnaire or the vote to the related information allotted to an orientation of the imaging object described above. Then, it is desirable to use textual information such as caption on the television image as instruction information for indicating relationship between this related information and an orientation of the imaging object.

The imaging object, the image data 21, the instruction information 23, the related information, the medium 20 and others have been described above. In the following, each configuration of the system 1 according to the first embodiment of the present invention will be specifically described.

(1-3. Imaging Object Generation Device)

Figure 5:
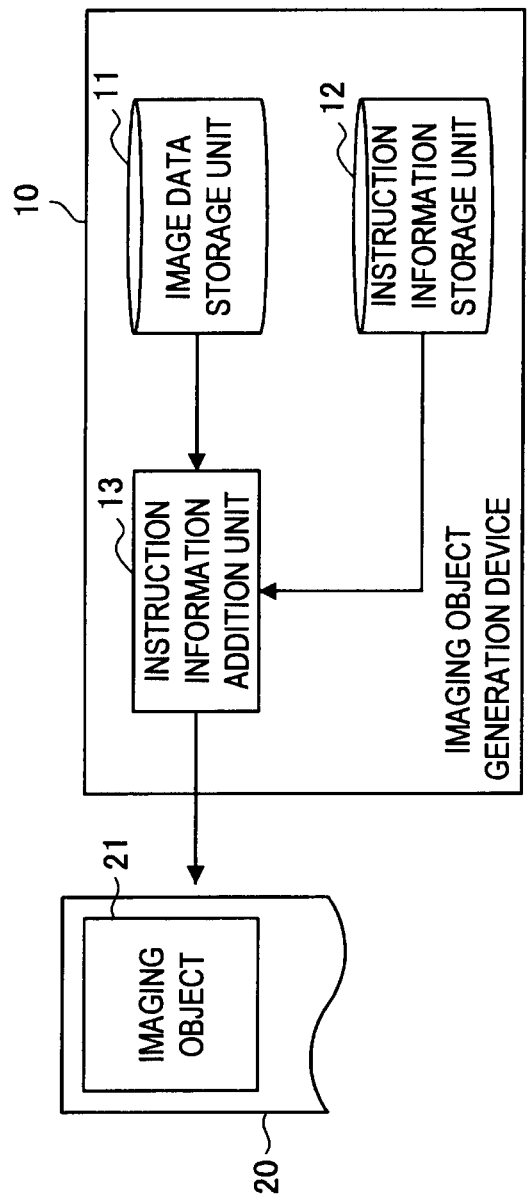
FIG. 5 is an explanatory diagram for explaining a configuration of an imaging object generation device according to the embodiment.

The image data 21 including the imaging object and the like is generated by the imaging object generation device 10 as described above. Description on the imaging object generation device 10 will be made with reference to FIG. 5. FIG. 5 is an explanatory diagram for explaining a configuration of an imaging object generation device according to the present embodiment.

As shown in FIG. 5, the imaging object generation device 10 includes an image data storage unit 11, an instruction information storage unit 12, and an instruction information addition unit 13.

The imaging object described above may be newly added to the image data 21 by the imaging object generation device 10, but description will be made here on the premise that the image data including the imaging object is recorded in the image data storage unit 11. However, in the case where the imaging object generation device 10 adds the imaging object to the image data 21, the imaging object generation device 10 preferably includes a storage unit in which an original image data is recorded, another storage unit in which the imaging object is recorded, and an image data generation unit, in addition to the above configuration. In this case, it is desirable that the image data generation unit obtains from the both storage units the original image data and the imaging object, generates the image data 21 by adding the imaging object to the original image data, and records the image data 21 in the image data storage unit 11.

On the other hand, the instruction information 23 described above is recorded in the instruction information storage unit 12, and the instruction information addition unit 13 adds this instruction information 23 to the image data 21. As a result, the imaging object generation device 10 can generate the image data 21 embodied on the medium 20 as illustrated in FIG. 4A to 4D. In addition, presentation of the image data 21 on the medium 20 may be performed by the imaging object generation device 10 or by another device. However, a case where this embodiment is performed by the imaging object generation device 10 will be described in the following description on an operation of the imaging object generation device 10.

(1-4. Operation of the Imaging Object Generation Device)

Figure 6:
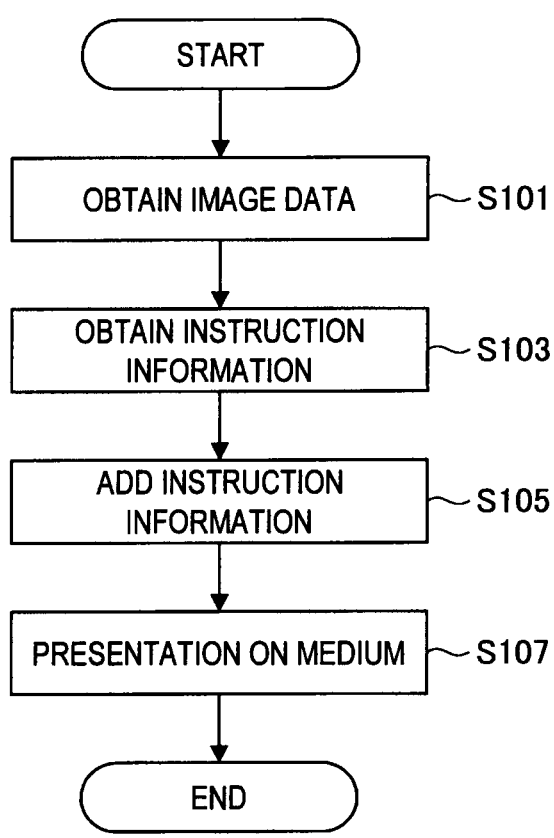
FIG. 6 is an explanatory diagram for explaining an operation of the imaging object generation device according to the embodiment.

Next, an operation of the imaging object generation device 10 will be described with reference to FIG. 6. FIG. 6 is an explanatory diagram for explaining an operation of an imaging object generation device according to the present embodiment.

As shown in FIG. 6, a step S101 is processed at first, and the instruction information addition unit 13 obtains the image data 21 from the image data storage unit 11. Then, a step S103 follows.

At the step 103, the instruction information addition unit 13 obtains the instruction information 23 from the instruction information storage unit 12. At this time, a plurality of instruction information 23 is recorded in the instruction information storage unit 12, and the instruction information addition unit 13 preferably selects one or more instruction information 23 according to the image data 21 obtained at the step S101 or the imaging object included in the image data 21. A step S105 follows the processing at the step S103.

At the step S105, the instruction information addition unit 13 adds the instruction information 23 obtained at the step S103 to the image data 21 obtained at the step S101.

At the step S107, the imaging object generation device 10 embodies the image data 21 including the imaging object and the like as the medium 20 (e.g., display or print). A variety of mediums can be used as the medium 20 as long as they are mediums capable of being imaged, as described above, and the image data 21 is embodied in a different manner according to the type of medium. Furthermore, in the case where the image data 21 is presented on the medium 20 by a device other than the imaging object generation device 10, the step S107 is processed by the device.

(1-5. Mobile Phone)

Figure 7:
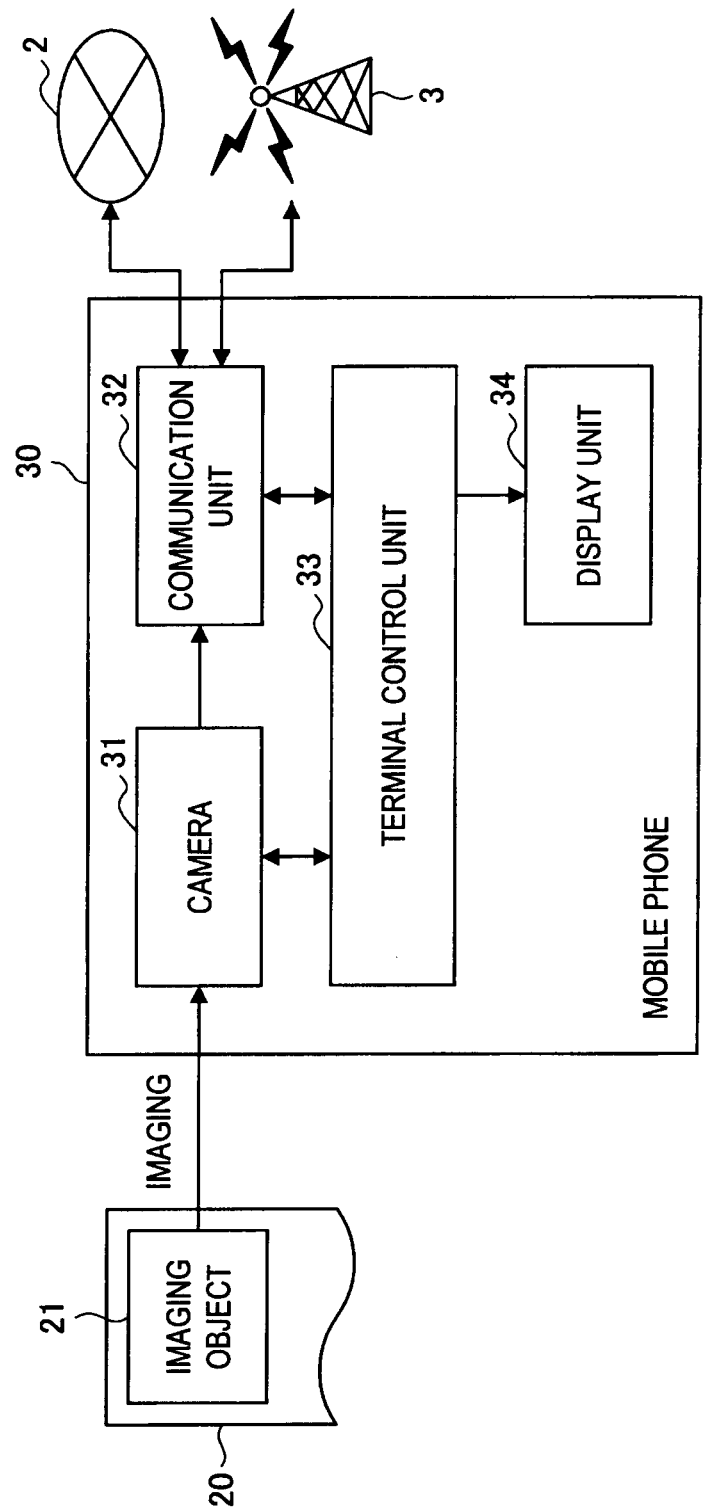
FIG. 7 is an explanatory diagram for explaining a configuration of a mobile phone according to the embodiment.

Next, the mobile phone 30 which is a component of the system 1 according to the first embodiment of the present invention will be described with reference to FIG. 7. FIG. 7 is an explanatory diagram for explaining a configuration of a mobile phone according to the present embodiment.

As shown in FIG. 7, the mobile phone 30 includes a camera 31, a communication unit 32, a terminal control unit 33, and a display unit 34.

The camera 31 is an example of an imaging device, which is controlled by the terminal control unit 33 and images at least the imaging object in the image data 21 displayed on the medium 20. The imaged image obtained as a result of imaging the imaging object is also referred to as "imaging data". Then, the imaging data is transmitted from the camera 31 to the communication unit 32. The communication unit 32 transmits the obtained imaging data to the server 40 via the network 2 or the radio relay antenna 3.

At this time, each component of the mobile phone 30 is controlled by the terminal control unit 33. On the other hand, the terminal control unit 33 controls the camera 31, the communication unit 32 and the like described above, according to an input signal input by an input device (not shown) after receiving operation by the user 4. Moreover, the terminal control unit 33 also controls the display unit 34, causes the display unit 34 to display on the display screen thereof information (e.g., response information which is an example of the related information and the like) obtained by the communication unit 32 from the outside, and notifies the user 4 of the information.

Moreover, the mobile phone 30 has functions such as that ordinary mobile phones have, such as a call function, a mail transmission/reception function, an application execution function, and a fingerprint detection function. However, such functions are not particularly limited and can be configured similarly to other ordinal mobile phones have, so that detailed description is omitted here.

(Imaging Data)

Here, the above-described "imaging data" will be described in detail. The imaging object imaged by the camera 31 of the mobile phone 30 is asymmetric in at least one of vertical direction and horizontal direction as described above, and has directionality. On the other hand, an image sensor of the camera 31 also has vertical and horizontal directionality, so that the imaging data obtained by being imaged by the camera 31 also has vertical and horizontal directionality. For example, assume that, when imaging the two-dimensional code 22B which is the imaging object illustrated in FIG. 3F, the imaging object is imaged with an angle such that the upper part of the imaging object is aligned with that of the camera 31. In this case, the top, bottom, left, and right of the imaging object included in the imaging data is aligned with the top, bottom, left, and right of the imaging data, respectively. Due to this positional relationship between the camera 31 and the imaging object, the imaging object is imaged after rotating the camera 31 (namely, the mobile phone 30) clockwise by 90 degrees or rotating the imaging object (namely, medium 20) counterclockwise by 90 degrees. Then, the top, bottom, left, and right of the imaging object included in the imaging data are rotated by 90 degrees and are aligned with the top, bottom, left, and right of the imaging data, respectively. In this manner, when the imaging object falls within the imaging range of the camera 31, and either the camera 31 or the imaging object is rotated with the camera 31 and the imaging object facing each other, an orientation of the imaging object included in the imaging data is also rotated with respect to the top, bottom, left, and right of the imaging data. That is, "the orientation of the imaging object" is included in the imaging data as position, form, rotation amount or the like. The orientation of the imaging object can be paraphrased as "rotation angle" of the top, bottom, left, or right of the imaging object with respect to the top, bottom, left, or right of the imaging data. However, the orientation of the imaging object is described here on the premise that the top of the imaging object is aligned with any one of the top, bottom, left, and right of the imaging data. That is, the description will be made on the premise that the above-mentioned rotation angle is set to every 90 degrees, but the rotation angle can be appropriately set. Then, in the following, the expression "which of the top, bottom, left, and right of the imaging object is aligned with the top of the imaging object" will be also used for expressing the orientation of the imaging object for the sake of convenience of description. If using the case where the camera 31 is rotated clockwise by 90 degrees as described above, the orientation of the imaging object is an orientation in which the left of the imaging object is aligned with the top of the image data. Furthermore, in this case, if rotating the camera 31 clockwise by 90 degrees, the orientation of the imaging object is an orientation in which the bottom of the imaging object is aligned with the top of the image data. Even furthermore, if rotating the camera 31 clockwise by 90 degrees, the orientation of the imaging object is an orientation in which the right of the imaging object is aligned with the top of the image data. Then, if further rotating the camera 31 clockwise by 90 degrees, the orientation of the imaging object is now rotated 360 degrees and it is an orientation in which the top of the imaging object is aligned with the top of the image data.

In addition, a case where the imaging object is the two-dimensional code 22B shown in FIG. 3F will be described in the following. There will be described a case where evaluation information (related information in a limited sense) by the user 4 and response information (included in the related information in a broad sense) desired by the user 4 are allotted to orientations of the imaging object. That is, there will be described a case where the related information corresponding to the instruction information which can be read without rotation is allotted to the top of the imaging object imaged in that unrotated state, among the instruction information arranged along the surrounding sides of the two-dimensional code 22B.

(1-6. Server)

Figure 8:
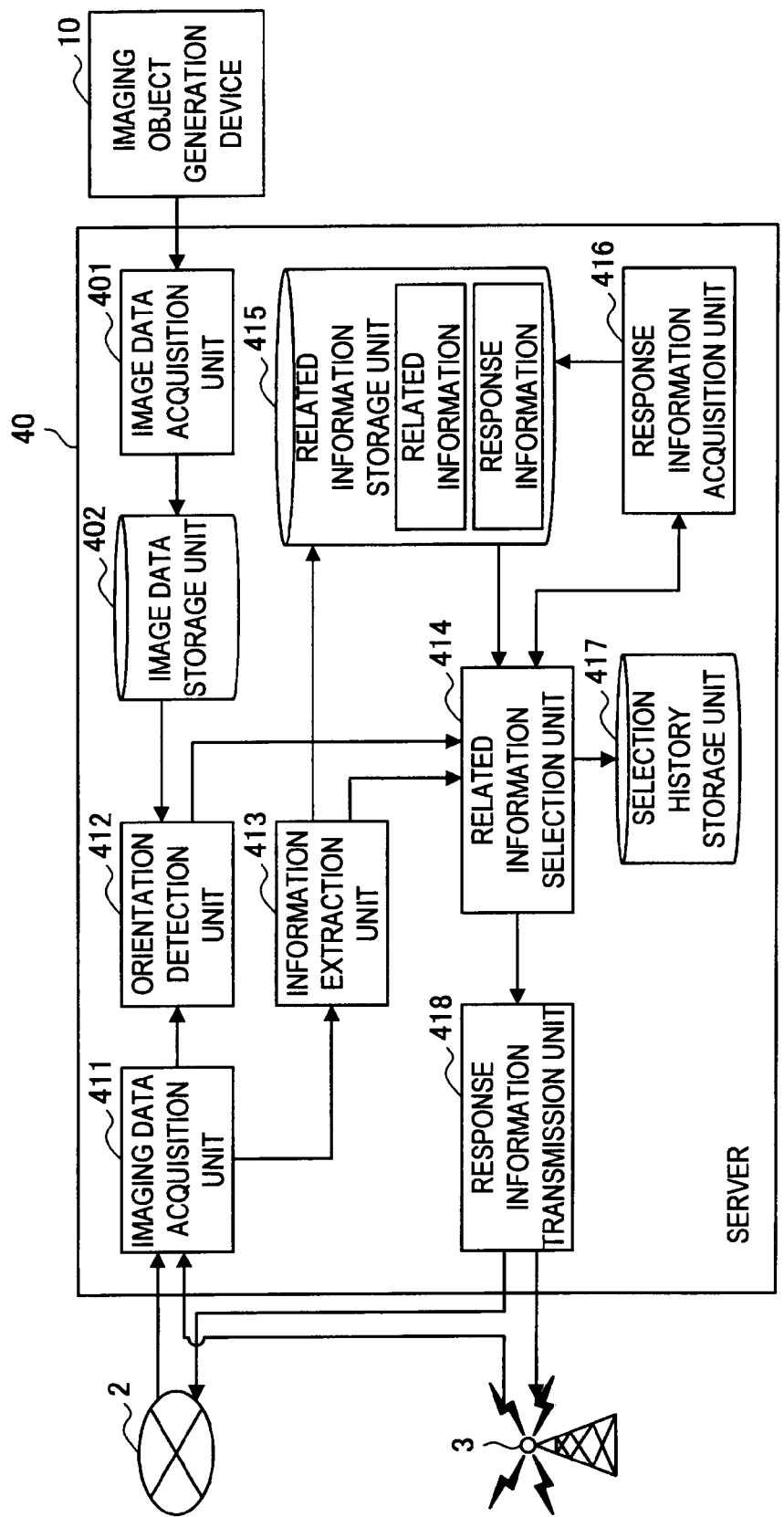
FIG. 8 is an explanatory diagram for explaining a configuration of a server according to the embodiment.

Next, the server 40 which is the remaining component of the system 1 according to the first embodiment of the present invention will be described with reference to FIG. 8. FIG. 8 is an explanatory diagram for explaining a configuration of a server according to the present embodiment.

As shown in FIG. 8, the server 40 includes an image data acquisition unit 401, an image data storage unit 402, an imaging data acquisition unit 411, an orientation detection unit 412, an information extraction unit 413, a related information selection unit 414, a related information storage unit 415, a response information acquisition unit 416, a selection history storage unit 417, a response information transmission unit 418.

The image data acquisition unit 401 obtains the image data including at least a part of the imaging object from the image data storage unit 11 of the imaging object generation device 10. At this time, the image data 21 also includes an image other than the imaging object as shown in FIG. 4A to 4D, for example, and the image data acquisition unit 401 obtains the image data including at least a part of the imaging data. Furthermore, it is desirable that the image data acquisition unit 401 obtains the image data including the entire imaging object and not including the other images in the image data 21 (except the instruction information). In addition, this image data also has vertical and horizontal directionality, so that each of the top, bottom, left, and right of the image data specifies the top, bottom, left, and right of the imaging object. Then, the image data acquisition unit 401 records obtained image data in the image data storage unit 402.

Then, the imaging data acquisition unit 411 obtains the imaging data transmitted from the mobile phone 30 via the network 2 or the radio relay antenna 3.

The orientation detection unit 412 detects the orientation of the imaging object with respect to the top, bottom, right, and left of the imaging data obtained by the imaging data acquisition unit 411. At this time, as an example of detection of the orientation of the imaging object, the orientation detection unit 412 obtains the image data including at least a part of the imaging object from the image data storage unit 402. Then, the orientation detection unit 412 detects the orientation of the imaging object by comparing the part of the imaging object included in the image data with the imaging object represented in the imaging data. For example, in the case where the two-dimensional code 22B shown in FIG. 3F is an imaging object, the imaging data includes at least a part of the imaging object with the instruction information 23B "GOOD" at the top of the imaging object. On the other hand, in the imaging data, an imaging object inversely rotated by the rotation angle of the camera 31 at the time of imaging is included. The top of the imaging data may be, for example, the instruction information 23B "GOOD" side (the upper side), or may be the instruction information 23C "AVERAGE" side (the left side) of the imaging object described above. Furthermore, the vertical orientation may also be the instruction information 23B "BAD" side (the bottom side), or may be the instruction information 23D "SHOP MAP" side (the right side). Accordingly, the orientation detection unit 412 detects the orientation of the imaging object included in the imaging data with respect to the top, bottom, left, and right of the imaging object in the image data.

In addition, although here is described a case where the orientation detection unit 412 detects the orientation of the imaging object by comparing the imaging object of the image data with that of the imaging data, comparison with the image data is not always necessary. For example, in the case where the two-dimensional code 22B shown in FIG. 3F is an imaging object, it is possible to specify the orientation of the two-dimensional code 22B by the form of the two-dimensional code 22B. As such a form, in the case of the two-dimensional code 22B shown in FIG. 3F, there is arranged at one of the four corners a pattern different from those at the other three corners, and thereby the orientation of the imaging object can be specified by specifying the one corner. In this case, the orientation detection unit 412 can detect the orientation of the imaging object without comparing the imaging object of the image data with that of the imaging data. In addition, the image data acquisition unit 401 and the image data storage unit 402 are not indispensable.

The information extraction unit 413 extracts, from the code (the two-dimensional code 22B in this case) included in the imaging data obtained by the imaging data acquisition unit 411, predetermined code information recorded in the code. An example of the code information to be extracted is, for example, information specifying a product or a service, such as URI (Uniform Resource Identifier) of the home page of the product or the service. In addition, the information extraction unit 413 is included in the server 40 included in the server 40 (or a server 60) both in the present embodiment and the second embodiment described in the following, but the information extraction unit 413 may be included in the mobile phone 30 (or a mobile phone 60).

The related information selection unit 414 selects one or more related information among a plurality of related information prepared and recorded in advance in the related information storage unit 415, according to the orientation of the imaging object detected by the orientation detection unit 412. In the case where the two-dimensional code 22B shown in FIG. 3F is an imaging object, related information such as evaluation of a predetermined product or service by the user 4 (e.g., three-grade evaluation of good, bad, and average; also referred to as evaluation information) is allotted to each of the orientations (the top, bottom, left, and right) of the imaging object. Then, the related information selection unit 414 selects, from this evaluation prepared in advance, related information allotted to the orientation of the imaging object detected by the orientation detection unit 412. A selection history by the related information selection unit 414 is recorded and accumulated in the selection history storage unit 417. In addition, in the case where the code information is information specifying the product or the service (e.g., URI) as described above, the selection history is desirably recorded in the selection history storage unit 417, being related with the product or the service.

On the other hand, other than the evaluation information (related information in a limited sense) by the user 4 described above, response information (related information in a broad sense) desired by the user 4 is recorded in the related information storage unit 415 in which a plurality of related information allotted to the orientations of the imaging object are recorded. The response information is also allotted to an orientation of the imaging object, and the related information selection unit 414 can also select the response information allotted to the orientation of the imaging object detected by the orientation detection unit 412. A selection history of the response information is also desirably recorded and accumulated in the selection history storage unit 417. Examples of the response information are, for example, home page of a product or a service, coupon ticket information, map information, a mail address, and a phone number. In the case where the two-dimensional code 22B shown in FIG. 3F is an imaging object, coupon information is allotted to the top, left, and bottom of the imaging object and map information is allotted to the right of the imaging object.

In addition, the related information such as the evaluation information is desirably prepared and recorded in the related information storage unit 415 in advance, but the response information which is related information in a broad sense is not necessarily recorded in the related information storage unit 415 in advance. For example, in the case where the response information is included in the two-dimensional code 22B as the code information, the response information extracted by the information extraction unit 413 may be recorded in the related information storage unit 415. In this case, the related information selection unit 414 can select, from among the recorded response information, the response information corresponding to the orientation of the imaging object. On the other hand, in the case where the code information extracted by the information extraction unit 413 is information specifying the product or the service (e.g., URI) as described above, for example, the related information selection unit 414 outputs this code information to the response information acquisition unit 416. Then, the response information acquisition unit 416, based on the code information, may obtain information relating to a product or a service specified by the information from another storage device (another server) and may record the information in the related information storage unit 415 as response information. In this case, the related information selection unit 414 can select the response information allotted to the orientation of the imaging object from among the response information related with the code information and obtained and recorded in the related information storage unit 415 by the response information acquisition unit 416.

The response information transmission unit 418 is an example of a related information transmission unit, and transmits the response information which is related information in a broad sense selected by the related information selection unit 414 to the mobile phone 30 via the network 2, the radio relay antenna 3 or the like. As a result, the communication unit 32 of the mobile phone 30 can obtain the response information and the terminal control unit 33 can display the response information on the display screen of the display unit 34 and notify the user 4 of the response information.

(1-7. System Operation)

Configuration and the like of the system 1 according to the first embodiment of the present invention have been described above. Next, an operation and the like of the system 1 according to the present embodiment will be described with reference to FIG. 9.

Figure 9:
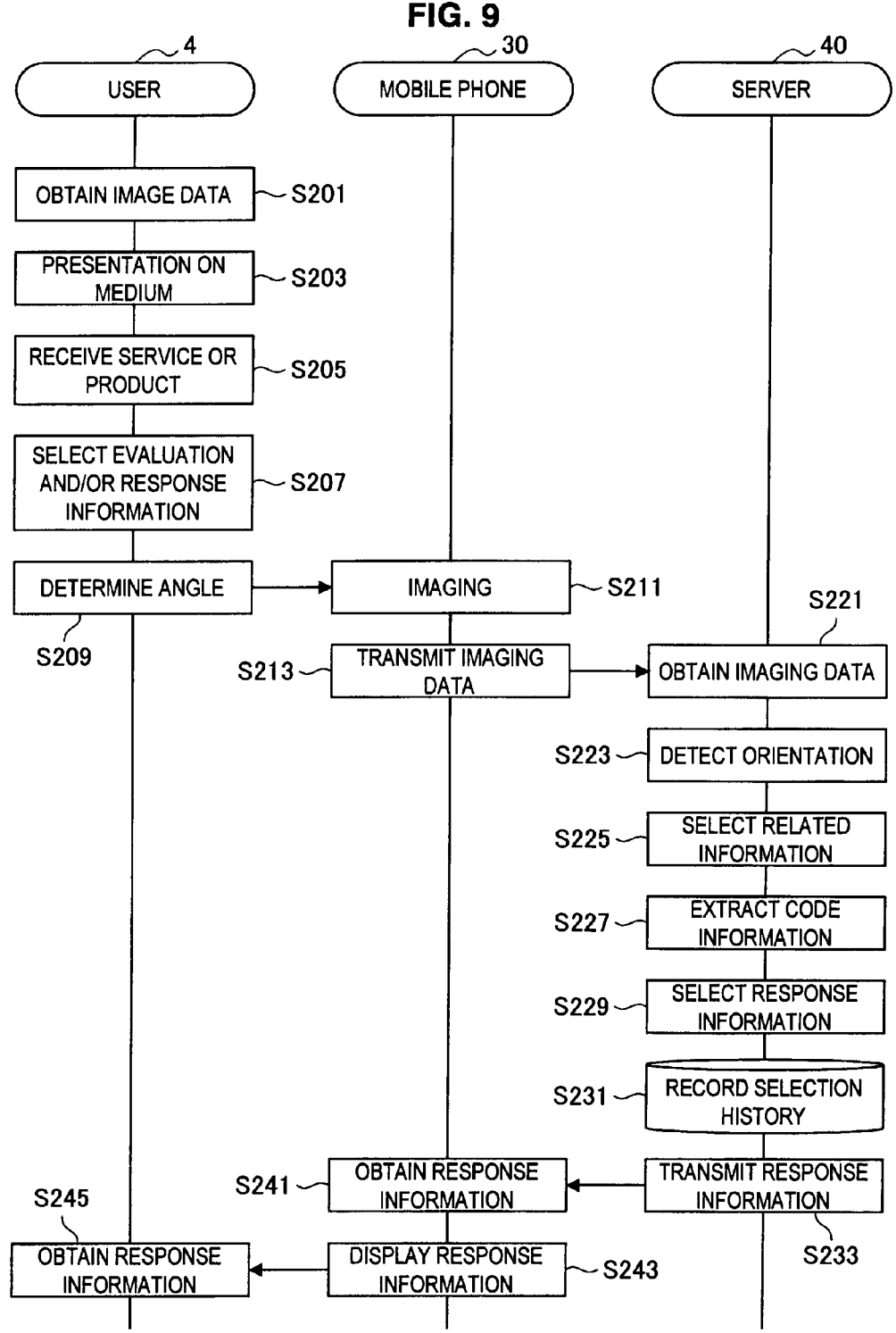
FIG. 9 is an explanatory diagram for explaining an operation of the system according to the embodiment.

FIG. 9 is an explanatory diagram for explaining an operation of a system according to the present embodiment. As shown in FIG. 9, first at the step 201, the user 4 operates a device or the like for presenting the image data 21 on a medium capable of being imaged (e.g., display or print) to obtain the image data 21 from the imaging object generation device 10 or the like. In addition, at this time, the user 4 does not need to obtain the image data 21 directly from the imaging object generation device 10 and can obtain The image data 21 from another recording device in which the image data 21 is recorded. A step S203 follows the processing of the step S201.

At the step S203, the user 4 operates a device or the like for presenting the image data 21 on a medium capable of being imaged (e.g., display or print) to cause the device to present the image data 21 on the medium 20. In addition, these step S201 and step S203 may be omitted in the case where the medium 20 is a wrapping paper of a product or the like which is unnecessarily prepared by the user 4 itself, for example. A step S205 follows the processing of the step S203.

At the step 205, the user 4 receives a product or a service such as purchasing the product or being provided a service. Then, a step S207 follows.

At the step S207, the user 4 evaluates the product or service received at the step S205, and/or selects the response information relating to the product or service which the user 4 desires to obtain. In addition, at this time, by referring to the instruction information 23 included in the image data 21 illustrated in FIG. 3F or the like, the user 4 can understand how he/she can evaluate, or what response information he/she can obtain. A step S209 follows the processing of the step S207.

At the step S209, the user 4 determines an angle (namely, an orientation of the imaging object) to image the imaging object corresponding to the evaluation information or response information determined at the step S207. At this time, since the medium 20 includes the instruction information 23, the user 4 can easily tell and determine the orientation of the imaging object. Then, a step S211 follows.

At the step S211, the camera 31 of the mobile phone 30 images the imaging object according to operation by the user 4. Then a step S213 follows.

At the step S213, the communication unit 32 of the mobile phone 30 transmits to the server 40 the imaging data obtained by the imaging at the step S211. Then, a step S221 follows.

At the step S221 (an example of an imaging data acquisition step), the imaging data acquisition unit 411 obtains the imaging data from the mobile phone 30. Then, a step S223 follows.

At the step S223 (an example of an orientation detection step), the orientation detection unit 412 detects the orientation of the imaging object based on the imaging data and in some cases the image data recorded in the image data storage unit 402. Then, a step S225 follows.

At the step S225 (an example of a related information selection step), the related information selection unit 414 selects one or more related information corresponding to the orientation of the imaging object from among a plurality of related information (e.g., evaluation information) prepared in advance and recorded in the related information storage unit 415. Then, a step S227 follows.

At the step S227, the information extraction unit 413 extracts, from the two-dimensional code 22B which is an imaging object included in the imaging data obtained at the step S221, the code information represented by the code. Then, the step S229 follows.

At the step S229 (an example of a related information selection step), the related information selection unit 414 selects one or more response information corresponding to the orientation of the imaging object from among a plurality of response information related with the code information extracted at the step S227. Then, a step S231 follows.

At the step S231, the related information selection unit 414 records in the selection history storage unit 417 a selection history of the related information at the step S225 and the step S229 described above. Then, a step S233 follows.

A the step S233, the response information transmission unit 418 transmits to the mobile phone 30 the response information selected at the step S229 described above. Then, a step S241 follows.

At the step S241, the communication unit 32 of the mobile phone 30 obtains the response information transmitted at the step S233 described above. Then, a step S243 is processed in which the terminal control unit 33 causes the display unit 34 to display on the display screen thereof the response information obtained at the step S241.

(1-8. Example of Advantages of the First Embodiment)

The configuration, operation and the like of the system 1 according to the first embodiment of the present invention have been described above. According to the system 1, when the user 4 images the imaging object by using the mobile phone 30, the user 4 simply images the imaging object by selecting an orientation of the imaging object, and thereby the server 40 can select the related information corresponding to the orientation of the imaging object. Accordingly, there can be easily collected statistical information reflecting the needs of the user 4, capable of being used for determining a direction of product development and a marketing strategy, for example, by setting the evaluation (satisfaction level) of a product or a service by the user 4 as related information. At this time, the user 4 only selects an angle to image the imaging object as described above, and does not have to perform an operation such as inputting a key separately, so that information can be collected without putting an excessive strain on the user 4. Since information is collected without putting an excessive strain on the user 4 in such a manner, the number of the users 4 cooperative in information collection increases, so that information collection can be carried out more certainly. Moreover, in the case where the server 40 detects the orientation or the like of the imaging object as in the present embodiment, the existing mobile phone 30 can be used without adding a new configuration thereto, so that the system 1 can be easily configured.

Furthermore, according to the system 1, the response information can be provided to the user 4 as related information corresponding to the orientation of the imaging object. Accordingly, the user 4 can obtain desired response information only by selecting an orientation of the imaging object, and the convenience of the user 4 greatly improves.

Moreover, the instruction information indicating the relationship between the orientation of the imaging object and the relationship information is added to the image data 21 including the imaging object by the imaging object generation device 10 according to the present embodiment. Accordingly, the user 4 operating the mobile phone 30 for imaging the imaging object can recognize the above relationship by referring to the instruction information and can appropriately select an angle of the camera 31 at the time of imaging the imaging object.

The system 1 according to the first embodiment of the present invention has been described above. Next, a system 5 according to the second embodiment of the present invention will be described. In addition, the system 5 according to the second embodiment of the present invention has a similar configuration because of performing a similar operation to the system 1 according to the first embodiment described above, but a part of the configuration is included not in the server but in a mobile phone, so that a new configuration is added. Accordingly, in the following, difference from the system 1 according to the first embodiment will be mainly described, and detailed description of the similar configuration will be appropriately omitted.

2. Second Embodiment

Implementation as a Mobile Phone

Figure 10:
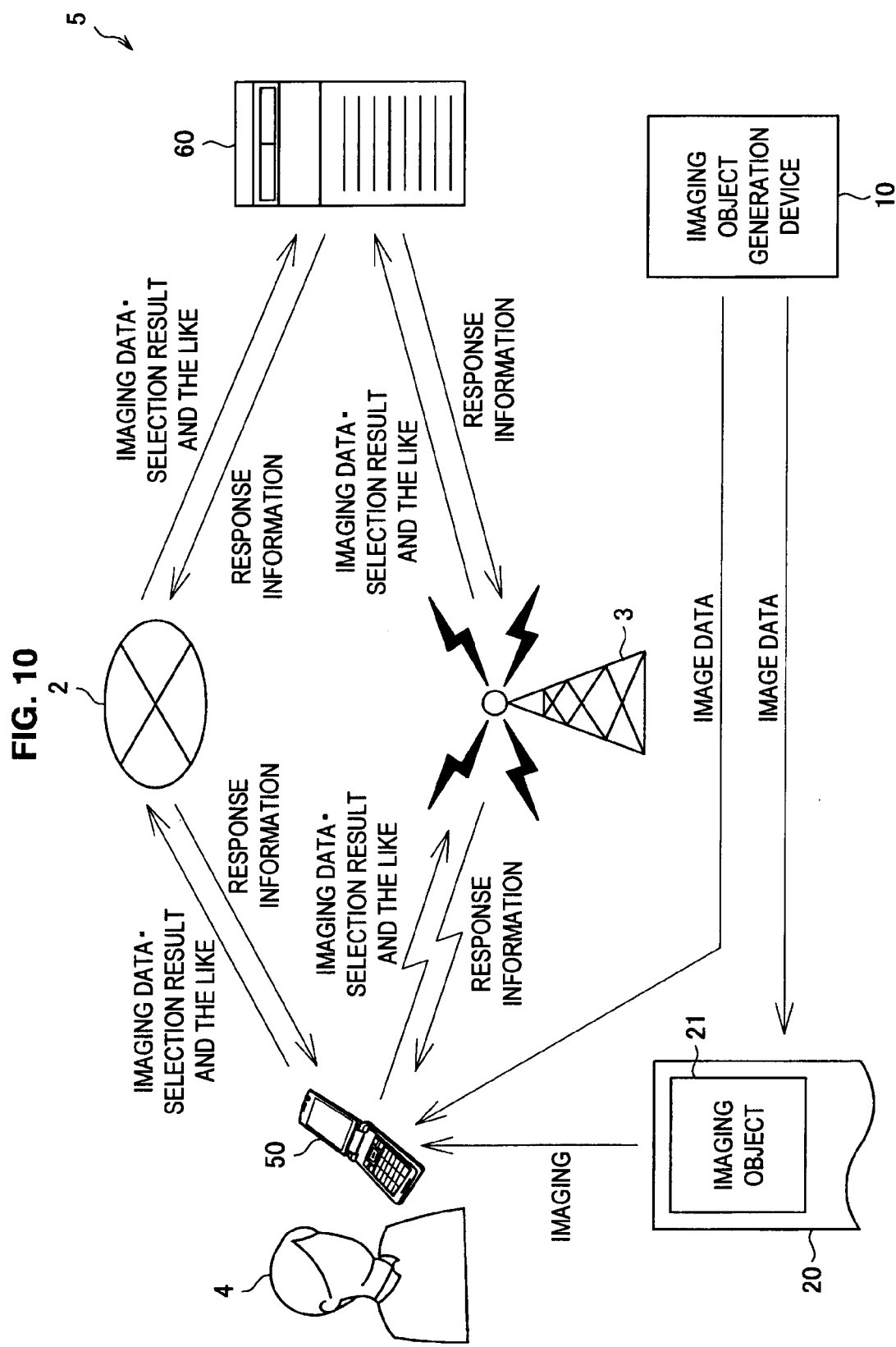
FIG. 10 is an explanatory diagram for explaining an overview of a system according to a second embodiment of the present invention.

First, an overview of the system 5 according to the second embodiment of the present invention will be described with reference to FIG. 10. FIG. 10 is an explanatory diagram for explaining an overview of a system according to the second embodiment of the present invention.

(2-1. System Overview)

As shown in FIG. 10, the system 5 according to the second embodiment of the present invention mainly includes the imaging object generation device 10, a mobile phone 50, and a server 60. In addition, the mobile phone 50 and the server 60 correspond to the mobile phone 30 and the server 40 according to the first embodiment described above, respectively.

The mobile phone 50 is operated by the user 4 and images the imaging object displayed on the medium 20. FIG. 10 illustrates only one mobile phone 50, but the number of the mobile phone 50 is not particularly limited and is preferably plural (enough number to obtain statistical data). When imaging the imaging object, the user determines an angle to image the imaging object (also referred to as "orientation of the imaging object"), and the mobile phone 50 images the imaging object with the angle. Accordingly, the orientation of the imaging object is included in imaged image data (also referred to as "imaging data") obtained by imaging by the mobile phone 50. Furthermore, the mobile phone 50 differs from the mobile phone 30 in that the mobile phone 50 also performs the operation which is, in the first embodiment, performed by the server 40. More specifically, the mobile phone 50 can extract the orientation of the imaging object from the imaging data and select related information corresponding to its extraction result from among a plurality of related information prepared in advance. Then, the mobile phone 50 transmits the selected related information to the server 60 (an example of an external storage device) via the network 2 or the radio relay antenna 3. On the other hand, the server 60 can accumulate a selection history of the related information corresponding to the orientation of the imaging object transmitted from the mobile phone 50. In addition, examples of the related information include a variety of information which a service or a product provider or a research operator desires to collect, such as users' evaluation (satisfaction level such as good, average, bad) of the service or the product. Accordingly, the user 4 can add such related information only by selecting the angle to image the imaging object, namely, the orientation of the imaging object in the imaging data (imaged image), and the system 5 can collect and accumulate the related information to the server 60.

On the other hand, the server 60 replies, in some cases, the related information (namely, the response information) corresponding to the orientation of the imaging object or the like to the mobile phone 50, similarly to the server 40 in the first embodiment described above. For this purpose, the mobile phone 50 also transmits the extracted orientation of the imaging object. As a result, the user 4 can selectively obtain desired response information only by selecting an angle to image the imaging object. On the other hand, in the case where the imaging object is the two-dimensional code 22B as shown in FIG. 3F or the like, the server 60 extracts the code information from the code and uses it for the selection of the response information. For this purpose, the mobile phone 50 also transmits the obtained imaging data to the server 60.

The overview of the system 5 according to the second embodiment of the present invention has been described above. In the following, each configuration of the system 5 will be described in detail. In addition, the description of the imaging object, the medium 20 on which the imaging object is displayed, the imaging object generation device 10 and the like has been made in detail in the first embodiment described above, so that it is omitted here.

(2-2. Mobile Phone)

Figure 11:
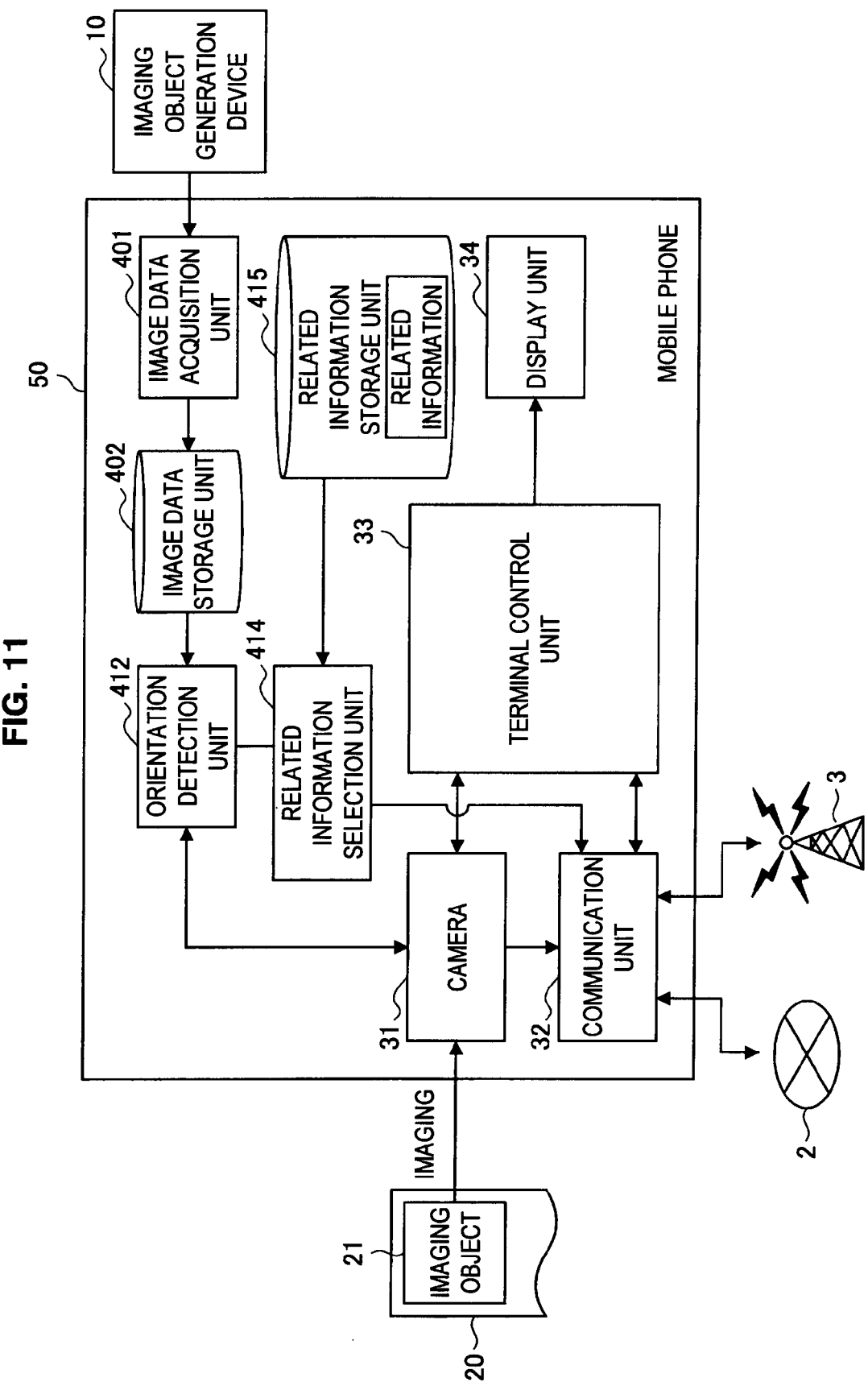
FIG. 11 is an explanatory diagram for explaining a configuration of a mobile phone according to the embodiment.

The mobile phone 50 which is a component of the system 5 according to the second embodiment of the present invention will be described with reference to FIG. 11. FIG. 11 is an explanatory diagram for explaining a configuration of a mobile phone according to the present embodiment.

In contrast to the first embodiment described above, the mobile phone 50 according to the present embodiment further performs orientation detection and related information (related information in a limited sense) selection, in addition to the operation performed by the mobile phone 30. For this purpose, in contrast to the first embodiment described above, the mobile phone 50 also includes a part of the configuration (referred to FIG. 8) included in the server 40, in addition to the configuration (referred to FIG. 7) included in the mobile phone 30.

That is, the mobile phone 50 includes the image data acquisition unit 401, the image data storage unit 402, the orientation detection unit 412, the related information selection unit 414, and the related information storage unit 415 included in the server 40 described above, in addition to the camera 31, the communication unit 32, the terminal control unit 33, and the display unit 34 included in the mobile phone described above. In the mobile phone 50, the configurations included not only in the mobile phone 30 but also in the server 40 function similarly to the first embodiment described above. Accordingly, detailed description is omitted here. However, if explaining the main difference, the explanation is as follows.

In contrast to the first embodiment, the orientation detection unit 412 obtains the imaging data directly from the camera 31. Accordingly, the camera 31 is an example of the imaging data acquisition unit in the present embodiment. Moreover, since the response information is selected at the server 60 side also in the present embodiment, only the related information in a limited sense (e.g., evaluation information) is recorded in the related information storage unit 415, so that the related information selection unit 414 will select the related information in a limited sense. Then, the communication unit 32 also transmits to the server 40 not only the imaging data transmitted in the first embodiment but also information indicating a selection result by the related information selection unit 414 and the orientation of the imaging object detected by the orientation detection unit 412.

In addition, configuration different from the first embodiment not illustrated here can be realized by adding a commonly-known technology or a commonly-used technology to the each configuration in the first embodiment described above.

(2-3. Server)

Figure 12:
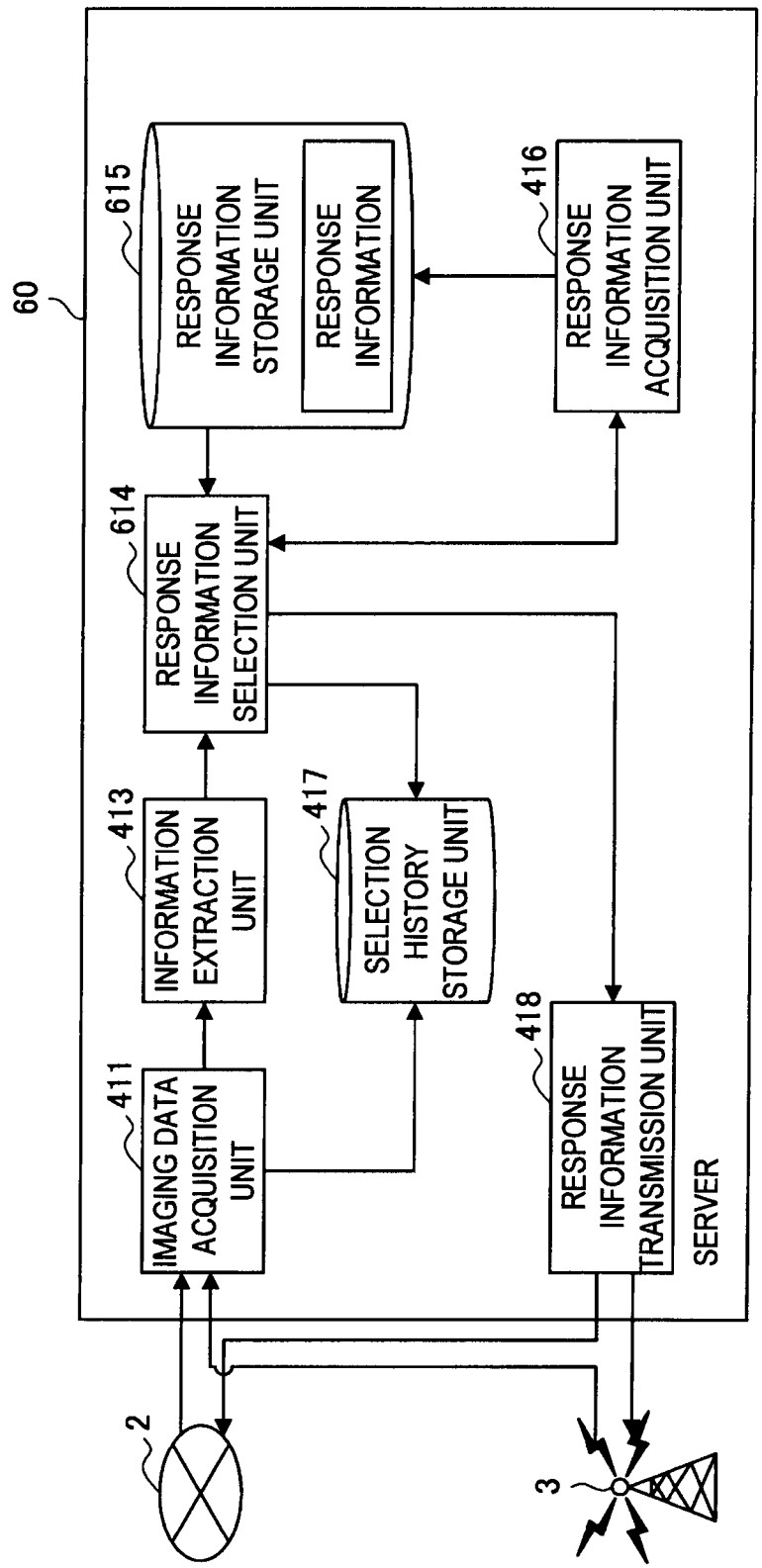
FIG. 12 is an explanatory diagram for explaining a configuration of a server according to the embodiment.

Next, the server 60 which is the remaining component of the system 5 according to the second embodiment of the present invention will be described with reference to FIG. 12. FIG. 12 is an explanatory diagram for explaining a configuration of a server according to the present embodiment.

In the system 5 according to the present embodiment, since selection of the related information and the like are performed in the mobile phone 50, the configuration of the server 60 according to the present embodiment is simple compared to that of the server 40 according to the first embodiment. However, the server 60 newly includes a response information selection unit 614 and a response information storage unit 615 in order to select the response information as described above. The other configurations included in the server 60 function similarly to the first embodiment described above. However, if explaining the main difference together with the new configuration described above, the explanation will be as follows.

In contrast to the first embodiment, the imaging data acquisition unit 411 obtains from the mobile phone 50 not only the imaging data but also the information indicating the detected orientation of the imaging object and the information indicating a selection result of the related information. Then, the imaging data acquisition unit 411 records and accumulates the information indicating a selection result in the selection history storage unit 417. On the other hand, the response information storage unit 615 is an example of a related information storage unit in the sense that the response information is an example of the related information in a broad sense, and the response information selection unit is similarly an example of a related information selection unit.

The response information storage unit 615 records therein the response information similarly to the related information storage unit 415 included in the server 40 in the first embodiment. The response information may be prepared in advance similarly to the first embodiment, but also may be obtained by the response information acquisition unit 416 and recorded in the related information storage unit 415.

The response information selection unit 614 can select the response information allotted to the orientation of the imaging object obtained from the mobile phone 50 similarly to the related information selection unit arranged in the server 40 in the first embodiment. Then, a selection history of the response information will be also recorded and accumulated in the selection history storage unit 417. That is, similarly to the first embodiment described above, in the case where the code information extracted by the information extraction unit 413 is information specifying the product or the service (e.g., URI) as described above, for example, the response information selection unit 614 outputs this code information to the response information acquisition unit 416. Then, the response information acquisition unit 416, based on the code information, may obtain information relating to the product or the service specified by the information from another storage device (another server) via the network 2, for example, and may record the information in the response information storage unit 615 as response information. In this case, the response information selection unit 614 can select the response information allotted to the orientation of the imaging object from among the response information related with the code information and obtained and recorded in the related information storage unit 415 by the response information acquisition unit 416.

In addition, configuration different from the first embodiment not illustrated here can be realized by adding a commonly-known technology or a commonly-used technology to the each configuration in the first embodiment described above.

(2-4. System Operation)

The configuration and the like of the system 5 according to the second embodiment of the present invention has been described above. Next, an operation of the system 5 according to the present embodiment will be described with reference to FIG. 13.

Figure 13:
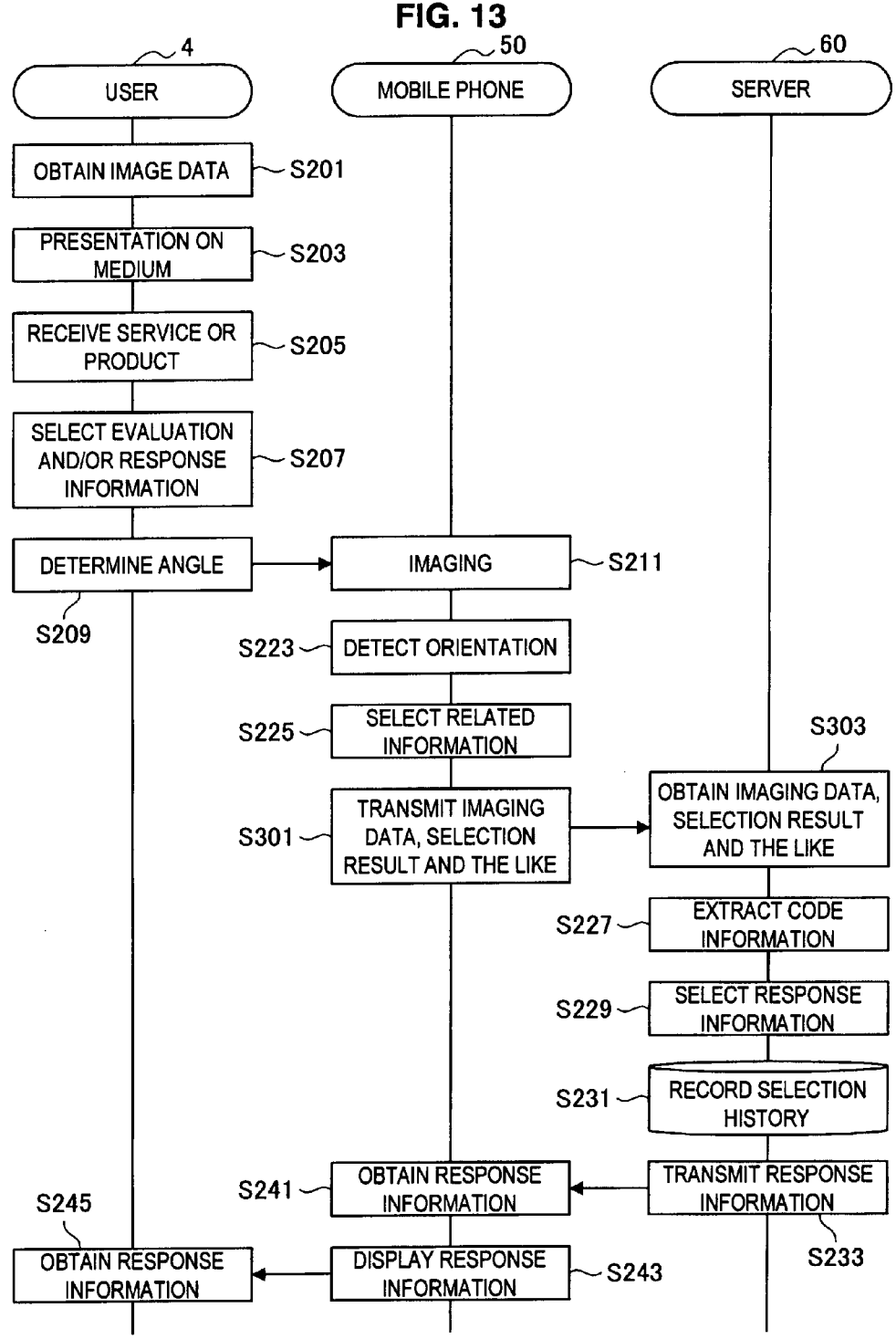
FIG. 13 is an explanatory diagram for explaining an operation of the system according to the embodiment.

FIG. 13 is an explanatory diagram for explaining an operation of a system according to the present embodiment. As shown in FIG. 13, the system 5 according to the present embodiment basically operates similarly to the system 1 according to the first embodiment, as is obvious from FIG. 9. However, the step S223 and the step S225 performed in the server 40 in the first embodiment are performed by the mobile phone 50. Then, a step S301 is processed after the processing of the step S225, and the communication unit 32 of the mobile phone 50 transmits the imaging data and the like described above to the server 60 at the step S301. Then, a step S303 is processed at which the server 60 obtains the imaging data and the like, and a step S227 follows. In addition, in the second embodiment, the step S211 is an example of the imaging data acquisition step. Since the processing at the other steps are basically similar to the first embodiment described above, detailed description thereof is omitted here.

(2-5. Example of Advantages of the Second Embodiment)

The configuration, the operation and the like of the system 5 according to the second embodiment of the present invention has been described above. According to the system 5, operational effect similar to the system 1 according to the first embodiment described above can be obtained. Moreover, in the system 5, since processing such as detection of the orientation of the imaging object is further performed by the mobile phone 50, the load on the server 60 side which collects information from a plurality of the mobile phones 50 can be reduced, so that information can be collected more easily.

Although a preferred embodiment of the present invention is described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

The case where the information extraction unit 413 is arranged in the server 40 or the server 60. However, the information extraction unit 413 may be included in the mobile phone 30 or the mobile phone 50, as well as or instead of the server 40 or the server 60. In this case, the information extraction unit 413 obtains the imaging data obtained by the camera 31 and extracts the code information from the code (e.g., the two-dimensional code shown in FIG. 3F) included in the imaging data. Then, the communication unit 32 transmits the code information to the server 40 or the server 60. In addition, at this time, the communication unit 32 can specify the server 40 or the server 60 based on the information (e.g., URI information) which is included in the code information and which specifies the server 40 or the server 60 and can transmit the code information to the specified server 40 or the server 60. In addition, in the case of the system 1 according to the first embodiment described above, the communication unit 32 transmits the imaging data together with the code information. On the other hand, in the case of the system 5 according to the second embodiment, the communication unit 32 transmits the code information together with information indicating the orientation of the imaging object and information indicating a selection history, but does not have to transmit the imaging data.

Moreover, in the above embodiments, there has been described the case where the related information selection unit 414 (and the response information selection unit 614) selects as related information not only the evaluation information (an example of the related information in a limited sense) but also the response information (an example of the related information in a broad sense), for example. However, the related information selected by the related information selection unit 414 and the like may be at least one of the related information in a limited sense such as the evaluation information and the response information included in the related information in a broad sense. For example, when only the related information in a limited sense (the evaluation information and the like) is selected, in the case of the first embodiment, the response information acquisition unit 416 and the response information selection unit 418 of the server 40 are not indispensable. Moreover, in the case of the second embodiment, the response information selection unit 614, the response information storage unit 615, the response information acquisition unit 416, and the response information transmission unit 418 of the server 60 are not indispensable. On the other hand, in the case where only the response information included in the related information in a broad sense is selected, in the second embodiment, the related information selection unit 414, the related information storage unit 415, and the response information acquisition unit 416 of the mobile phone 50 are not indispensable.

Moreover, in the above embodiments, there has been described the case where the selection history of the related information by the related information selection unit 414 is recorded in the selection history storage unit 417, for example. However, in the case of the system 1 according to the first embodiment described above, for example, the selection history storage unit 417 can record therein the imaging data obtained by the imaging data acquisition unit 411 instead of or together with the selection history.

Figure 14:
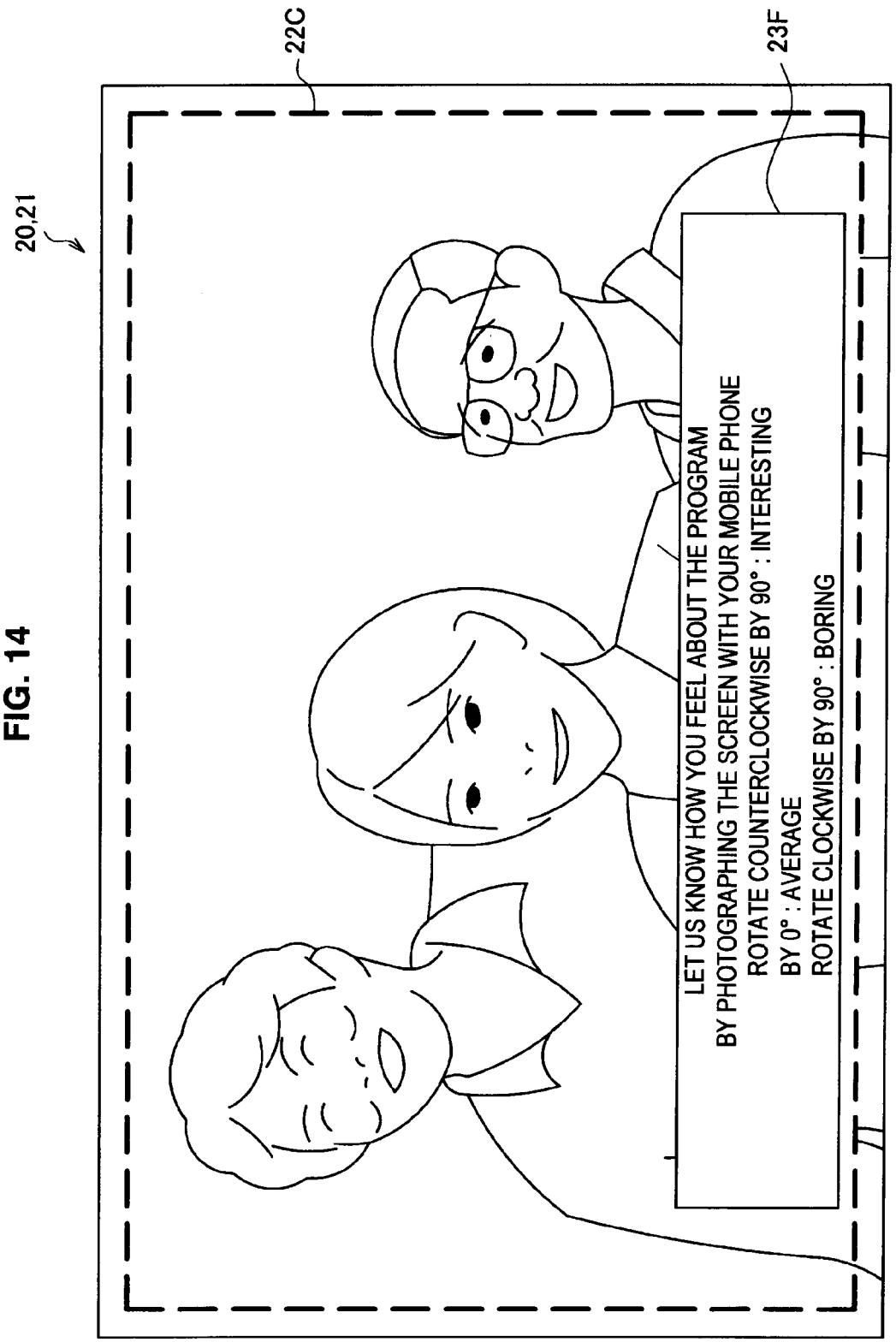
FIG. 14 is an explanatory diagram for explaining a first modification of the imaging object according to each embodiment of the present invention.

Moreover, in the description of the above embodiments, the one-dimensional code 22A and the two-dimensional code 22B are illustrated as an example of the imaging object, for example. However, the imaging object is not limited to the example as described above, and a variety of imaging objects can be used as long as they are asymmetric in at least one of vertical direction and horizontal direction, prepared in advance, and capable of being imaged by an imaging device. For example, FIG. 14 shows a first modification of the imaging object according to each embodiment of the present invention. In the first modification, a case where a television image (may be a moving image or still image) is used as the medium 20 on which the imaging object is displayed. In this case, as shown in FIG. 14, it is possible to use a television image 22C itself displayed on a display device (not shown) and the like as the imaging object. In addition, in this case, there is preliminarily recorded in the image data storage unit 402 of the server 40 the image data 21 including at least a part of the television image 22C which is the imaging object. Then, the orientation detection unit 412 detects the orientation of the imaging object in the imaging data by comparing the image data 21 and the imaging data. Moreover, in the case of this example, the imaging object generation device 10 preferably adds to the image data 21, as caption and the like on the television image, an explanatory text such as that showing the relationship between the orientation of the imaging object and the related information (e.g., evaluation by the user 4 such as "interesting, average, and boring") in the instruction information 23F.

Figure 15:
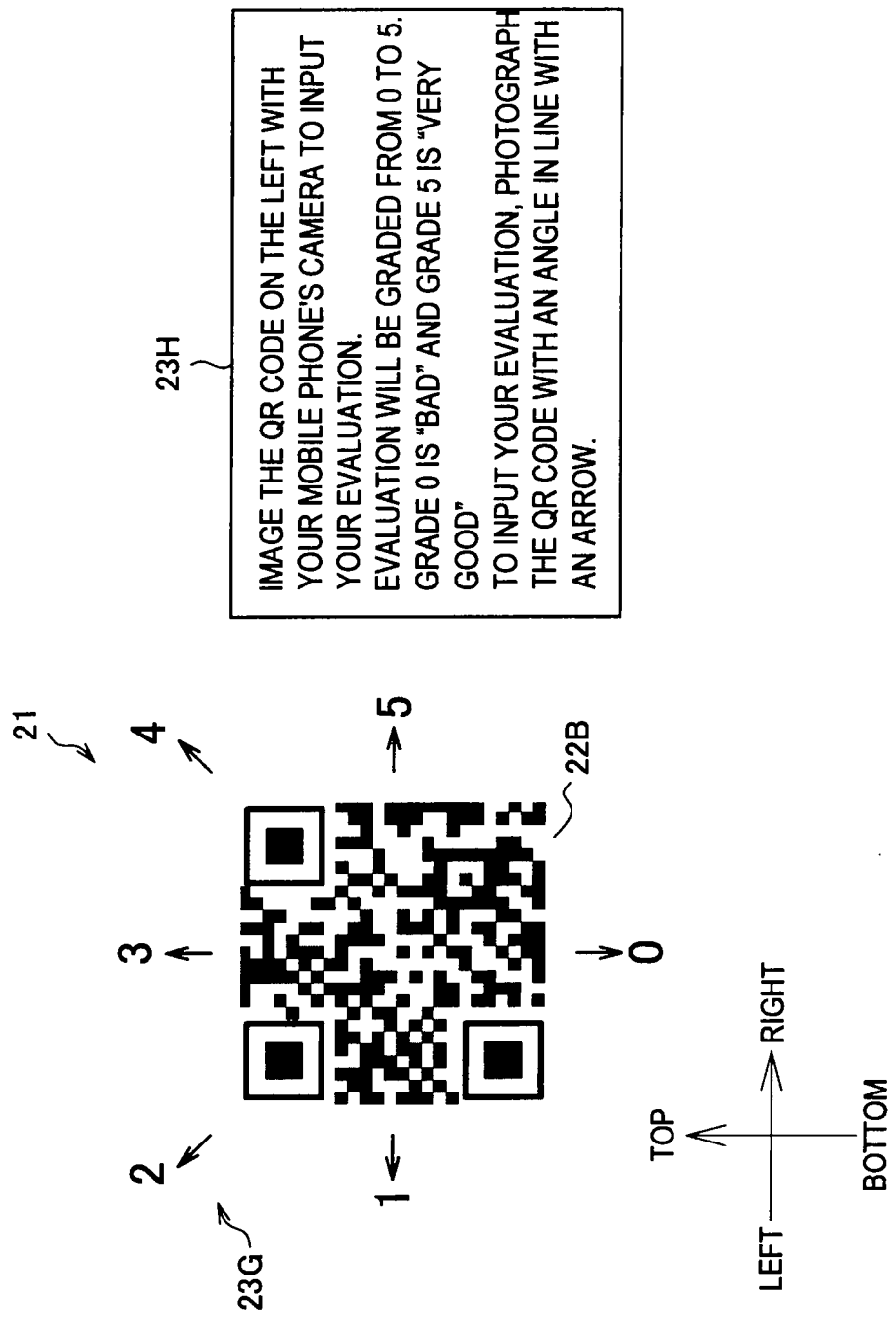
FIG. 15 is an explanatory diagram for explaining a second modification of the imaging object according to the each embodiment of the present invention.

Moreover, for example, the case where one or more related information is allotted to each of the top, bottom, left, and right of the imaging object has been described in the above embodiments. That is, there has been described the case where the related information is allotted to each of the four sides of the imaging object in the imaging data. However, the resolution of the orientation of the imaging object to which such related information is related is not limited to 90 degrees (four patterns at the maximum in this case). That is, the resolution of the orientation of the imaging object can be appropriately set. For example, FIG. 15 shows a second modification of the imaging object according to each embodiment of the present invention. In the second modification, as shown in instruction information 23G and 23H added around the two-dimensional code 22B which is an example of the imaging object, the related information is related also to directions other than the upward, downward, leftward, and rightward directions. For example, in this second modification, the related information indicating an evaluation from 0 to 5 is allotted to an orientation of the imaging object (a tilt angle) by the angular resolution of 45 degrees or 90 degrees. In this case, the orientation detection unit 412 detects how much degrees the imaging object is tilted to be imaged (also referred to as "rotation angle" of the imaging object) as the orientation of the imaging object, by comparing the imaging object included in the imaging data and at least a part of the imaging object included in the image data 21. Then, the related information selection unit 414 can select one or more related information allotted the rotation angle from among a plurality of related information stored in the related information storage unit 415.

Moreover, the imaging object is not limited to a two-dimensional object and may be a one-dimensional object or three-dimensional object. In the case of one-dimensional object, the orientation of the imaging object is detected based on the direction, in which the angle of the long side of the one-dimensional object is oriented when being imaged, with respect to the top, bottom, left, and right of the imaging data. On the other hand, in the case of three-dimensional object, the orientation of the imaging object can be represented not only by information about the rotation angle of the image of the three-dimensional object seen from one side in the imaging data but also by information about the direction from which the three-dimensional object is seen when being imaged. In this case, the image data of the imaging object seen from a plurality of directions of the top, bottom, left, right, front, and back is recorded in the image data storage unit 402. Then, the orientation detection unit 412 obtains the image data and specifies the angle with which the imaging object was imaged based on the image data and the imaging data.

Moreover, in the above embodiments, there has been described the case where the orientation detection unit 412 detects the orientation of the imaging object from the imaging object included in the imaging data, but a detection method of the orientation of the imaging object by the orientation detection unit 412 is not limited to this example. For example, a gravity detection device or an acceleration detection device (Gyro and the like) can be used for the detection of the orientation of the imaging object. When such a gravity detection device or an acceleration detection device is used, in the case of the system 1 according to the first embodiment described above, for example, the mobile phone 30 further includes a gravity detection device or an acceleration detection device. In this case, the gravity detection device or the acceleration detection device overlays on the imaging data the direction of the gravity or the direction of the acceleration at the time of the imaging object being imaged the camera 31 as a direction signal, and transmit it to the server 40. Then, the orientation detection unit 412 may obtain the direction signal and specify the orientation of the imaging object. Moreover, in the case of the system 5 according to the second embodiment described above, the orientation detection unit 412 of the mobile phone 50 may include the gravity detection device or the acceleration detection device and detect the orientation of the imaging object based on the direction signal output from the gravity detection device or the acceleration detection device.

Moreover, a series of processing (processing in the system 1 and 2) described in each of the above embodiments may be performed by dedicated hardware or by software. In the case where the series of processing is performed by software, a general-purpose or dedicated computer 900 as shown in FIG. 16 is caused to execute a program thereby enabling to implement the series of processing described above.

FIG. 16 is an explanatory diagram for explaining a configuration example of the computer 900 for implementing the series of processing by the execution of the program. The execution of the program for performing the series of processing by the computer 900 will be described as follows.

As shown in FIG. 16, the computer includes, for example, a bus 901 and a bus 902, a bridge 903, a CPU (Central Processing Unit) 904, a recording device, an input/output interface 907, an input device 908, an output device 909, a connection port 910, a drive 912, a communication device 914 and the like. Each of such components is connected so as to be able to transmit information to each other via the bus 201 and the bus 902 connected via the bridge 903, the input/output interface 907 and the like.

The program can be recorded in, for example, a storage device 911 such as HDD (Hard Disk Drive) or SSD (Solid State Drive), a ROM (Read Only Memory) 905, or a RAM (Random Access Memory) 906, which is an example of the recording device.

Moreover, the program can be temporarily or permanently recorded in, for example, a removable recording medium 913 such as a magnetic disk including flexible disk, an optical disc including various CD (Compact Disc), MO (Magneto Optical) disc, and DVD (Digital Versatile Disc) or the like, a semiconductor memory or the like. Such a removable recording medium 913 can be provided as so-called package software. The program recorded in such a removable recording medium 913 may be read out by the drive 912 and recorded in the recording device described above via the input/output interface 907, the buses 901 and 902 or the like.

Furthermore, the program can be recorded in a download site, another computer, another recording device or the like (not shown), for example. In this case, the program is transferred via a network 915 such as LAN (Local Area Network) or the Internet and is received by the communication device 914. Moreover, the program may be transferred from another recording device or communication device or the like connected to a connection port 923 such as USB (Universal Serial Bus). Then, the program received by the communication device 914 or the connection port 923 may be recorded in the recording device described above via the input/output interface 907, the buses 901 and 902 or the like. In addition, at this time, the communication device 914 can obtain the program via wireless communication similarly to the communication unit 32 of the mobile phone 30.

Then, by the CPU 904 executing a variety of processing according to the program recorded in the recording device described above, the series of processing described above is realized. At this time, the CPU 904 may execute the program by reading it out directly from the recording device described above or after temporarily loading it into the RAM 905, for example. Furthermore, when receiving the program via the communicating device 914 or the drive 912, for example, the CPU 904 may directly execute the received program without recording the same on the recording device.

Furthermore, the CPU 904 may perform the variety of processing based on a signal or information input from the input device 908 such as a mouse, a keyboard, a microphone (not shown) or another input device connected to the connection port 910, as necessary. In the case where the mobile phone 30 is realized by the computer 900, the input device 908 may include the camera 31, or the camera 31 may be connected to the connection port 910.

Then, the CPU 904 may output a result of the execution of the series of processing described above from, for example, the output device such as a display device such as a monitor, or an audio output device such as a speaker or a headphone. Furthermore, the CPU 904 may transmit the processing result from the communication device 914 or the connection port 910 as necessary and record the same in the recording device described above or the removable recording medium 913.

In addition, in the present specification, the steps described in the flow chart include not only processing steps carried out in time series in the described order but also processing steps carried out in parallel or individually and not necessarily in time series. Moreover, the order of the processing steps carried out in time series can be also appropriately changed in some cases, of course.

The present application contains subject matter related to that disclosed in Japanese Priority Patent Application JP 2009-017189 filed in the Japan Patent Office on Jan. 28, 2009, the entire content of which is hereby incorporated by reference.

What is claimed is:

1. An information processing apparatus comprising:
   an imaging data acquisition unit for obtaining imaging data obtained by imaging an imaging object which is asymmetric in at least one of vertical direction and horizontal direction;
   an image data storage unit in which image data including at least a part of the imaging object is recorded in advance;
   an orientation detection unit for detecting the orientation of the imaging object with respect to the top, bottom, left, and right of the imaging data obtained by the imaging data acquisition unit by comparing the imaging object included in the imaging data obtained by the imaging data acquisition unit and at least the part of the imaging object included in the image data recorded in the image data storage unit; and
   a related information selection unit for selecting one or more related information, from among a plurality of related information prepared in advance, according to the orientation of the imaging object detected by the orientation detection unit.

2. The information processing apparatus according to claim 1, wherein
   the orientation detection unit detects, as the orientation of the imaging object, at least an angle of the top, bottom, left, and right of the imaging object with respect to the top, bottom, left, and right of the imaging data obtained by the imaging data acquisition unit, and
   the related information selection unit selects the related information according to the angle of the imaging object detected by the orientation detection unit.

3. The information processing apparatus according to claim 1, wherein
   the imaging data acquisition unit obtains the imaging object imaged by an external terminal including an imaging device and transmitted from the terminal, and
   the information processing apparatus further includes a selection history storage unit for accumulating a selection history of the related information by the related information selection unit.

4. The information processing apparatus according to claim 1, wherein
   the imaging data acquisition unit is an imaging device for imaging the imaging object, and
   the information processing apparatus further includes a communication unit for transmitting to an external storage device a selection result of the related information by the related information selection unit.

5. The information processing apparatus according to claim 3, further comprising:
   a related information transmission unit for transmitting to the terminal the related information selected by the related information selection unit.

6. The information processing apparatus according to claim 5, wherein
   the image is a one-dimensional or two-dimensional code in which predetermined code information is recorded,
   the information processing apparatus includes an information extraction unit for extracting, from the code included in the imaging data obtained by the imaging data acquisition unit, the predetermined code information recorded in the code, and
   the related information selection unit selects the related information allotted to the orientation of the imaging object, based on the predetermined code information extracted by the information extraction unit and the orientation of the imaging object detected by the orientation detection unit, from among the plurality of related information related with the predetermined code information.

7. The information processing apparatus according to claim 1, wherein the imaging object includes instruction information indicating a relationship between an orientation of the imaging object to be photographed and related information to be selected by the related information selection unit.

8. The information processing apparatus according to claim 1, wherein
the plurality of related information prepared in advance are a plurality of evaluation information each of which indicates a user satisfaction level with a product or a service related with the imaging object, and
the related information selection unit selects one of the evaluation information according to the orientation of the imaging object.

9. An information processing method, comprising the steps of:
recording in advance image data including at least a part of the imaging object in an image data storage unit;
obtaining imaging data obtained by imaging an imaging object which is asymmetric in at least one of vertical direction and horizontal direction;
detecting the orientation of the imaging object with respect to the top, bottom, left, and right of the imaging data obtained at the imaging data obtaining step by comparing the imaging object included in the imaging data and at least the part of the imaging object included in the image data recorded in the recording step; and
selecting one or more related information, from among a plurality of related information prepared in advance, according to the orientation of the imaging object detected at the orientation detecting step.

10. A non-transitory computer readable medium storing instructions for causing a computer to perform the functions of:
recording image data including at least a part of the imaging object;
obtaining imaging data obtained by imaging an imaging object which is asymmetric in at least one of vertical direction and horizontal direction;
detecting the orientation of the imaging object with respect to the top, bottom, left, and right of the imaging data obtained by the imaging data obtaining function step by comparing the imaging object included in the imaging data and at least the part of the imaging object included in the image data recorded in the recording function; and
selecting one or more related information, from among a plurality of related information prepared in advance, according to the orientation of the imaging object detected by the orientation detecting function.

11. A system comprising:
a terminal for imaging an imaging object which is asymmetric in at least one of vertical direction and horizontal direction; and
a server for obtaining imaging data obtained by imaging the imaging object from the terminal, wherein
at least one of the terminal and the server includes an imaging data acquisition unit for obtaining the imaging data obtained by imaging the imaging object,
an image data storage unit for storing in advance image data including at least a part of the imaging object,
an orientation detection unit for detecting the orientation of the imaging object with respect to the top, bottom, left, and right of the imaging data obtained by the imaging data acquisition unit by comparing the imaging object included in the imaging data obtained by the imaging data acquisition unit and at least the part of the imaging object included in the image data recorded in the image data storage unit, and
a related information selection unit for selecting one or more related information, from among a plurality of related information prepared in advance, according to the orientation of the imaging object detected by the orientation detection unit.

* * * * *